United States Patent
Zhang et al.

(10) Patent No.: US 9,806,874 B2
(45) Date of Patent: Oct. 31, 2017

(54) SPECTRUM ENHANCEMENT AND USER EQUIPMENT COEXISTENCE THROUGH UPLINK/DOWNLINK DECOUPLING FOR TIME DIVISION DUPLEXING AND THROUGH NON-CONTINUOUS FRAME STRUCTURES FOR FREQUENCY DIVISION DUPLEXING

(71) Applicant: Apple Inc., Cupertino, CA (US)

(72) Inventors: Dawei Zhang, Saratoga, CA (US);
Tarik Tabet, Los Gatos, CA (US);
Farouk Belghoul, Campbell, CA (US);
Huarui Liang, Beijing (CN)

(73) Assignee: Apple Inc., Cupertino, CA (US)

( * ) Notice: Subject to any disclaimer, the term of this patent is extended or adjusted under 35 U.S.C. 154(b) by 185 days.

(21) Appl. No.: 14/690,632

(22) Filed: Apr. 20, 2015

(65) Prior Publication Data
US 2015/0326378 A1    Nov. 12, 2015

Related U.S. Application Data

(60) Provisional application No. 61/990,774, filed on May 9, 2014.

(51) Int. Cl.
H04L 5/14    (2006.01)
H04W 72/04    (2009.01)
(Continued)

(52) U.S. Cl.
CPC ............... *H04L 5/14* (2013.01); *H04L 5/003* (2013.01); *H04L 5/0005* (2013.01);
(Continued)

(58) Field of Classification Search
None
See application file for complete search history.

(56) References Cited

U.S. PATENT DOCUMENTS

2007/0286156 A1*  12/2007  Gormley .............. H04B 7/2615
                                                        370/350
2011/0134746 A1    6/2011  Liu et al.
(Continued)

FOREIGN PATENT DOCUMENTS

| CN | 101729125 A | 6/2010 |
| EP | 2667652 A1 | 11/2013 |
| WO | 2013133758 A1 | 9/2013 |

OTHER PUBLICATIONS

Office Action for ROC (Taiwan) Patent Application No. 104114793, dated May 5, 2016, 11 pages.
(Continued)

*Primary Examiner* — Chi H Pham
*Assistant Examiner* — Raul Rivas
(74) *Attorney, Agent, or Firm* — Meyertons Hood Kivlin Kowert & Goetzel, P.C.; Jeffrey C. Hood

(57) ABSTRACT

Mobile devices, base stations, and/or relay stations may implement methods for decreasing required guard bands while also minimizing Adjacent Channel Leakage Ratio, when multiple mobile devices communicate over different respective adjacent specified frequency bands. For communications over at least one specified frequency band of the different respective adjacent frequency bands, a first bandwidth of uplink communications and/or a second bandwidth of downlink communications may be adjusted to differ from each other, and/or a communications bandwidth within the specified frequency band may be adjusted to be of a first size during a first portion of a specified data transmission period and to be of a second size during a second portion of the specified data transmission period, when at least some of the communications over the specified frequency band take place at frequencies adjacent to frequencies at which at least (Continued)

some of the communications take place over another specified frequency band.

20 Claims, 18 Drawing Sheets

(51) Int. Cl.
  *H04W 76/02* (2009.01)
  *H04L 5/00* (2006.01)
  *H04L 27/36* (2006.01)
(52) U.S. Cl.
  CPC .......... *H04L 5/0028* (2013.01); *H04L 27/368* (2013.01); *H04W 72/0453* (2013.01); *H04W 76/023* (2013.01)

(56) References Cited

U.S. PATENT DOCUMENTS

| | | |
|---|---|---|
| 2011/0286370 A1 | 11/2011 | Tang et al. |
| 2012/0082070 A1 | 4/2012 | Hart et al. |
| 2012/0257519 A1 | 10/2012 | Frank et al. |
| 2013/0148636 A1 | 6/2013 | Lum et al. |
| 2013/0322308 A1 | 12/2013 | Yu et al. |

OTHER PUBLICATIONS

Search Report and Written Opinion, International Application No. PCT/US2015/027747, dated Jul. 9, 2015, 11 pages.

\* cited by examiner

SPECTRUM ENHANCEMENT AND USER EQUIPMENT COEXISTENCE THROUGH UPLINK/DOWNLINK DECOUPLING FOR TIME DIVISION DUPLEXING AND THROUGH NON-CONTINUOUS FRAME STRUCTURES FOR FREQUENCY DIVISION DUPLEXING

PRIORITY CLAIM

This application claims benefit of priority of U.S. Provisional Patent Application Ser. No. 61/990,774 titled "Spectrum Enhancement and UE Coexistence Through UL/DL Decoupling for TD-LTE and Non-continuous Frame Structures for FDD LTE", filed on May 9, 2014, which is hereby incorporated by reference as though fully and completely set forth herein.

FIELD OF THE INVENTION

The present application relates to wireless communication devices, and more particularly to methods for providing more efficient coexistence among wireless communications devices.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

One aspect of wireless data transmission is the division of the transmission spectrum, whereby wireless communications may simultaneously take place in different frequency bands allocated for such purposes. However, the proximity of the frequency bands to each other oftentimes results in interference in one frequency band or channel, caused by extraneous power from a signal in an adjacent frequency band or channel. Broadcast regulators frequently manage the broadcast spectrum in order to minimize adjacent-channel interference. For example, in North America, FM (Frequency Modulation) radio stations in a single region cannot operate on adjacent frequencies.

The adjacent-channel interference experienced by a first receiver from a second transmitter is the sum of the power that the second transmitter emits into the channel of the first receiver, and the power that the first receiver picks up from the second transmitter in the first channel. The power that the second transmitter emits into the channel of the first receiver is typically known to as an "unwanted emission", and is represented by what is referred to as Adjacent Channel Leakage Power (ACLP), while the power that the first receiver picks up from the second transmitter in the first channel is represented by what is referred to as Adjacent Channel Selectivity (ACS). Unwanted emissions occur because RF (Radio Frequency) filters require a roll-off, and therefore fail to completely eliminate a leaked signal. Therefore, the second transmitter emits some power in the adjacent channel which is picked up by the first receiver, and the first receiver receives some emissions from the second transmitter in the first channel due to the roll off of the selectivity filters.

In contrast to FM radio stations (mentioned above), the LTE (Long Term Evolution) standard allows for transmissions/communications in adjacent bands or channels. Stemming from other specifications in the LTE standard, in order to avoid unwanted emissions and minimize ACLP between channels, guard bands are used to effectively "isolate" adjacent bands from each other. This, however, leads to wasted bandwidth which limits use of the allocated band. It is therefore desirable to improve the signal transmission scheduling such that the wasted bandwidth is minimized while also minimizing ACLP.

SUMMARY OF THE INVENTION

Embodiments described herein relate to a User Equipment (UE) device, base station, and/or relay station, and associated method for decreasing unused bandwidth when multiple UE devices operate in respective frequency bands that are adjacent to each other, while simultaneously minimizing Adjacent Channel Leakage Power (ACLP) associated with each frequency band. Thus, communication within a wireless network may be established over at least a first frequency band and a second frequency band. The first frequency band and the second frequency band do not overlap, but they may be adjacent to each other. For at least one frequency band of the first and second frequency bands, at least one of a first bandwidth of uplink communications (in the frequency band) and a second bandwidth of downlink communications (in the frequency band) may be adjusted such that the first bandwidth is different from the second bandwidth, when at least some of the communications in the frequency band would to take place at frequencies adjacent to frequencies at which communications take place in the other frequency band. Uplink communications in the frequency band may then be performed according to the first bandwidth, and downlink communications in the frequency band may be performed according to the second bandwidth.

In other embodiments, communication within a wireless network may be established over at least a first frequency band and a second frequency band. The first frequency band and the second frequency band do not overlap, but they may be adjacent to each other. For at least one frequency band of the first frequency band and the second frequency band, the communications bandwidth within the frequency band may be adjusted to be of a first size for communications that take place during a first portion of a specified data transfer period, e.g. during a first portion of the radio frame transmission period, and to be of a second size for communications that take place during a second portion of the specified data transfer period, which may be the remaining portion of the radio frame transmission period, when at least some of the communications in the frequency band would to take place at frequencies adjacent to frequencies at which communications take place in the other frequency band. Uplink communications and/or downlink communications over (or in) the frequency band may then be performed according to the communications bandwidth of the first size during the first portion of the specified data transmission period and according to the communications bandwidth of the second size during the second portion of the data transmission period.

Figure 1:
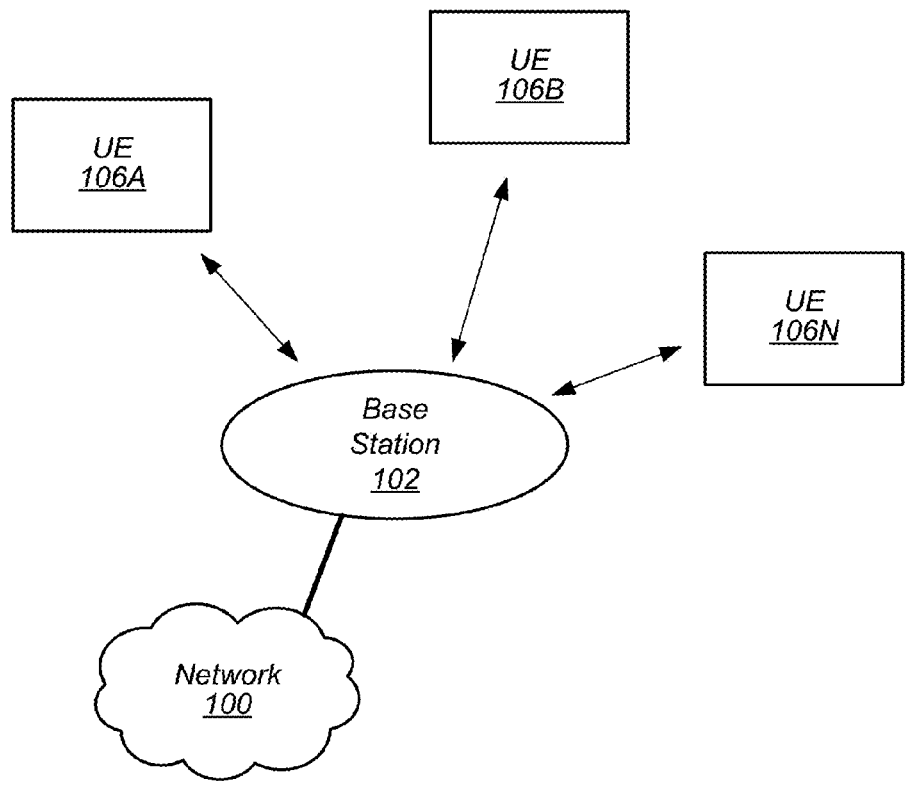
FIG. 1 shows an exemplary block diagram of a simplified wireless communications system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

BS: Base Station
CSI: Channel State Information
DL: Downlink
FDD: Frequency Division Duplexing
GSM: Global System for Mobile Communication
HARQ: Hybrid Automatic Repeat reQuest
LTE: Long Term Evolution
RAN: Radio Access Network
RX: Reception
TDD: Time Division Duplexing
TM: Transparent Mode
TX: Transmission
UE: User Equipment
UL: Uplink
UMTS: Universal Mobile Telecommunication System Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (e.g. smart watches, smart glasses), or other similar devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
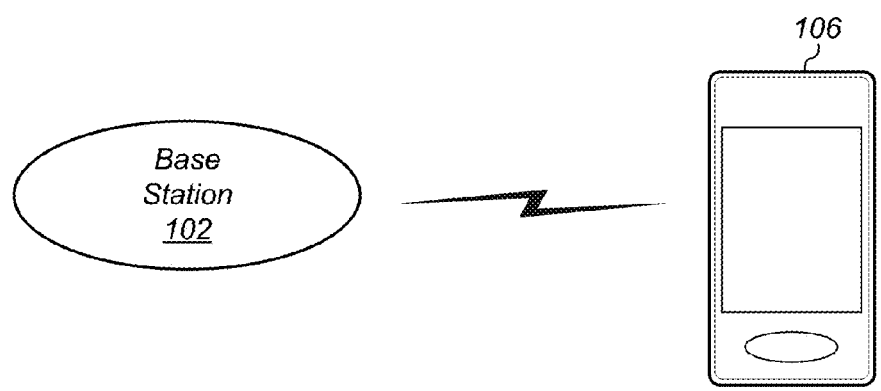
FIG. 2 shows an exemplary block diagram of a base station in communication with a wireless user equipment (UE) device, according to some embodiments.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired. As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell."

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to communicate with base station 102 according to improved UL and DL decoupling methods as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols.

For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and Bluetooth. Other configurations are also possible.

Figure 3:
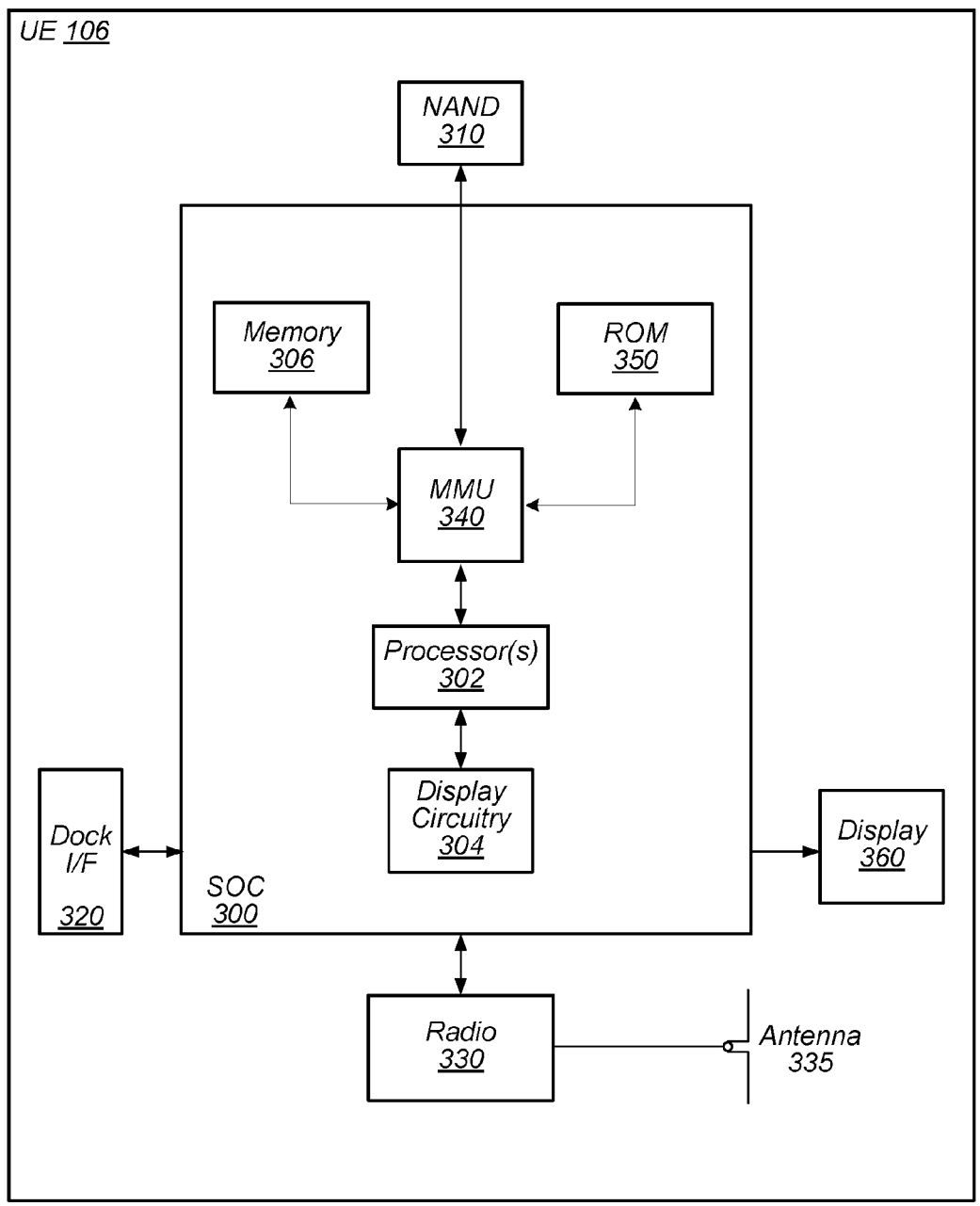
FIG. 3 shows an exemplary block diagram of a UE, according to some embodiments.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector OF 320, and/or display 360. The MMU 340 may be configured to perform memory protection and page table translation or set up. In some embodiments, the MMU 340 may be included as a portion of the processor(s) 302. Radio 330 may include transceiver circuitry for transmitting and receiving RF signals, and may also include associated amplifiers, e.g. power amplifiers (PA) used to amplify transmitted signals in order to increase transmit signal power.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, Bluetooth, Wi-Fi, GPS, etc.). The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described further subsequently herein, the UE 106 may include hardware and software components for implementing a method for improved decoupling of UL and DL transmissions. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Furthermore, processor 302 may be coupled to and/or may interoperate with other components as shown in FIG. 3, to reduce power consumption in VoLTE terminals using SPS in C-DRX mode, as will be further described below in the section "Saving Power for VoLTE Terminals".

Figure 4:
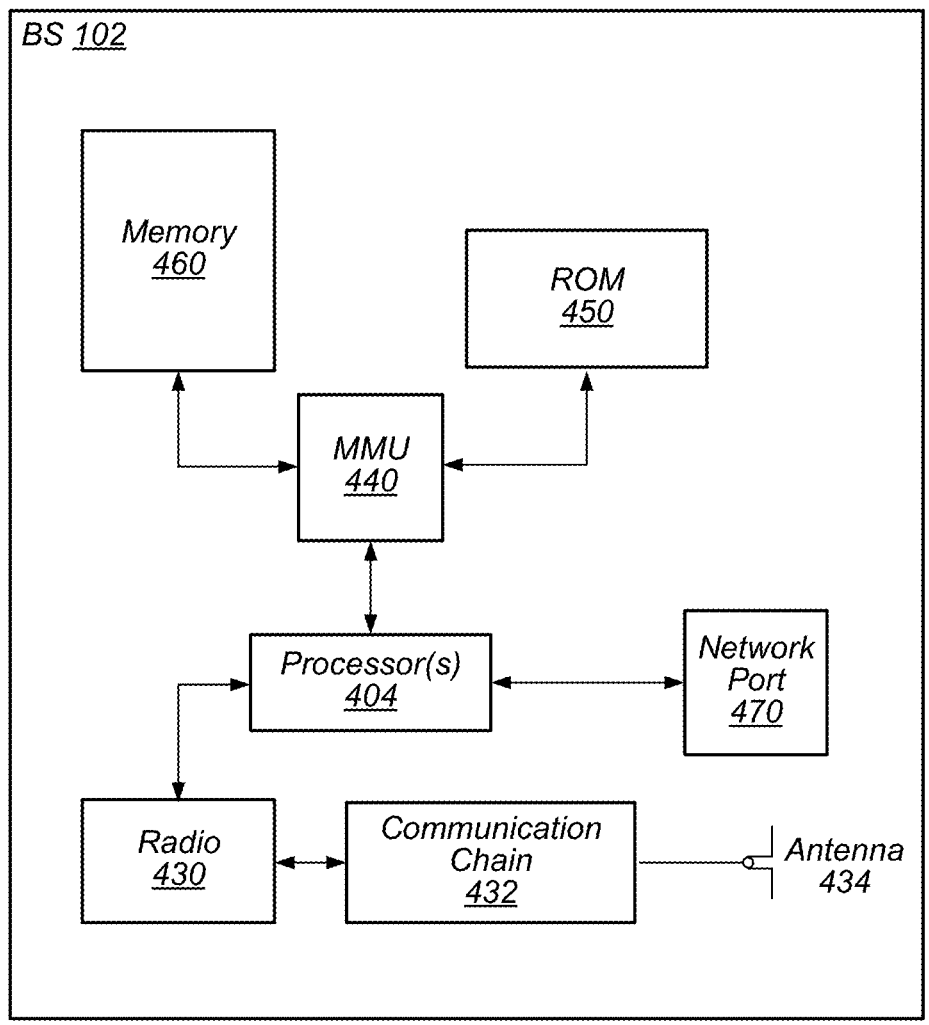
FIG. 4 shows an exemplary block diagram of a base station, according to some embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A WCDMA, CDMA2000, etc. The processor 404 of the base station 102 may be configured to implement part or all of the methods described herein for improved decoupling of UL and DL transmissions, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 5:
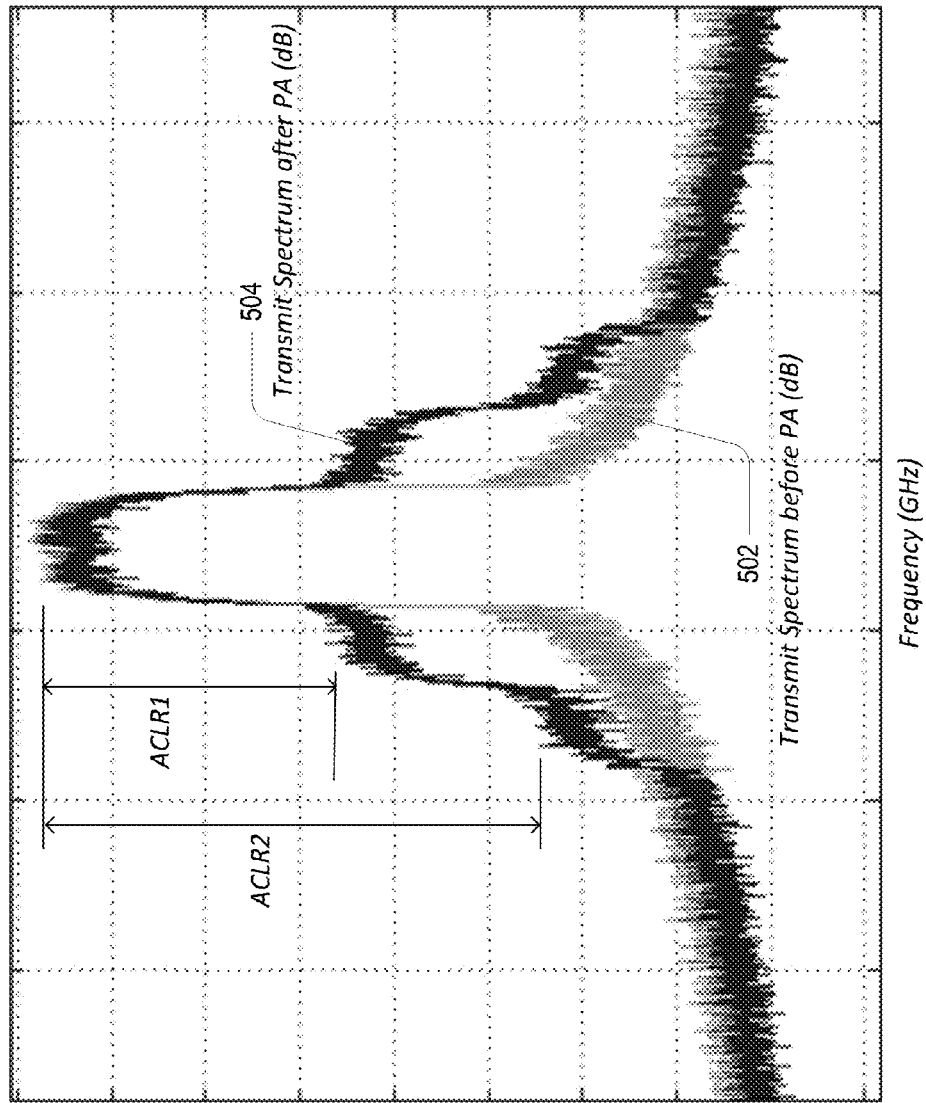
FIG. 5 shows a diagram illustrating LTE transmission spectra according to prior art.

FIG. 5—LTE Transmission Spectrums

The following provides some background on the UE adjacent channel leakage power according to 3GPP TS36.101. It is noted that while 3GPP TS36.101 is used in order to provide a specific, easy to follow illustration, FIG. 5 is meant to provide an illustration of the existence of channel leakage power when wireless communications take place on adjacent channels in a general sense. In a digital wireless communication system such as LTE, the power that leaks from a transmitted signal into adjacent channels can interfere with transmissions in the neighboring channels and impair system performance. A common measure for this leakage interference is referred to as the adjacent channel leakage-power ratio (ACLR). The ACLR is the ratio of the filtered mean power centered on the assigned channel frequency to the filtered mean power centered on an adjacent channel frequency.

FIG. 5 shows a frequency diagram that illustrates current (i.e. prior art) LTE transmission spectrums. That is, FIG. 5 illustrates two different waveforms as a function of frequency, with a first waveform 502 representative of the transmit spectrum (signal strength provided in dB) before PA (Power Amplification) as a function of frequency (scaled in units of GHz as shown), and a second waveform 504 representative of the transmit spectrum after PA as a function of frequency (scaled in GHz). The first waveform 502 "before PA" is the waveform prior to passing through the power amplifier (e.g. the power amplifier included in radio 330 shown in FIG. 3), and is the more "clean" waveform that does not exhibit significant distortions. In contrast, the second waveform 504 "after PA" is the waveform produced by the output of the power amplifier and does exhibit distortions which are introduced by non-linearity in the power amplifier. The "shoulders" of the waveform designated as ACLR1 and ACLR2 represent "spillover" spectral energy (unwanted emissions) to adjacent channels that can impact the performance of the adjacent channels.

The LTE standard specifies how large ACLR1 and ACLR2 may be in order to meet a certain level of coexistence. More generally, wireless transmission standards and/or specifications may specify how large ACLR values may be in order to meet prescribed levels of coexistence. According to LTE (as an example of one wireless communications standard), the UE's maximum transmit signal is 23 dBm, no matter the frequency band or how wide the channel bandwidth. Also, the LTE standard and the 3GPP TS36.101 specification limits ACLR1 to 30 dB or more, and limits ACLR2 to be 36 dB or more. Accordingly, the first adjacent channel leakage power is 23 dBm−30 dBm=−7 dBm. Assuming 20 MHz channels (i.e. channels having a 20 MHz bandwidth), this results in a −20 dBm/MHz of adjacent channel leakage power. Also, the second adjacent channel leakage power is then 23 dBm−36 dBm=−13 dBm. Again, assuming 20 MHz channels, this results in −26 dBm/MHz of adjacent channel leakage power. In order for UEs to be able to coexist with each other, the 3GPP default specification for UE coexistence is −50 dBm/MHz. Thus, if a first UE is operating and an adjacent channel is used by a second UE, ACLR1 at −20 dBm/MHz is −30 dB short of the requirement, and thus impermissible adjacent channel leakage power occurs.

In order to address the above issue, many UEs include front-end filters that attempt to reduce this adjacent channel leakage power. The limitations on the UE Front-end filter can be expressed as follows. For 2 GHz filters, approximately 10-12 MHz is required to reach 30 dB skirt rejection. Thus a 10 MHz-12 MHz guard band is needed to achieve 30 dB of skirt rejection. An additional 6 MHz of guard band is needed to account for possible temperature drift to cover operation of the UE in a temperature range of approximately −55° C. to +10° C. An additional 1-2 MHz of guard band tolerance may also be required to account for manufacturing variance. The addition of the above guard band numbers means that a 20 MHz guard band is desired for the UE to guarantee coexistence with other UEs at adjacent frequencies. Thus if two UEs are operating on adjacent channels with a 20 MHz guard band between the channels, the use of front-end filters will operate to reduce the adjacent channel leakage power by 30 dB.

Figure 6:
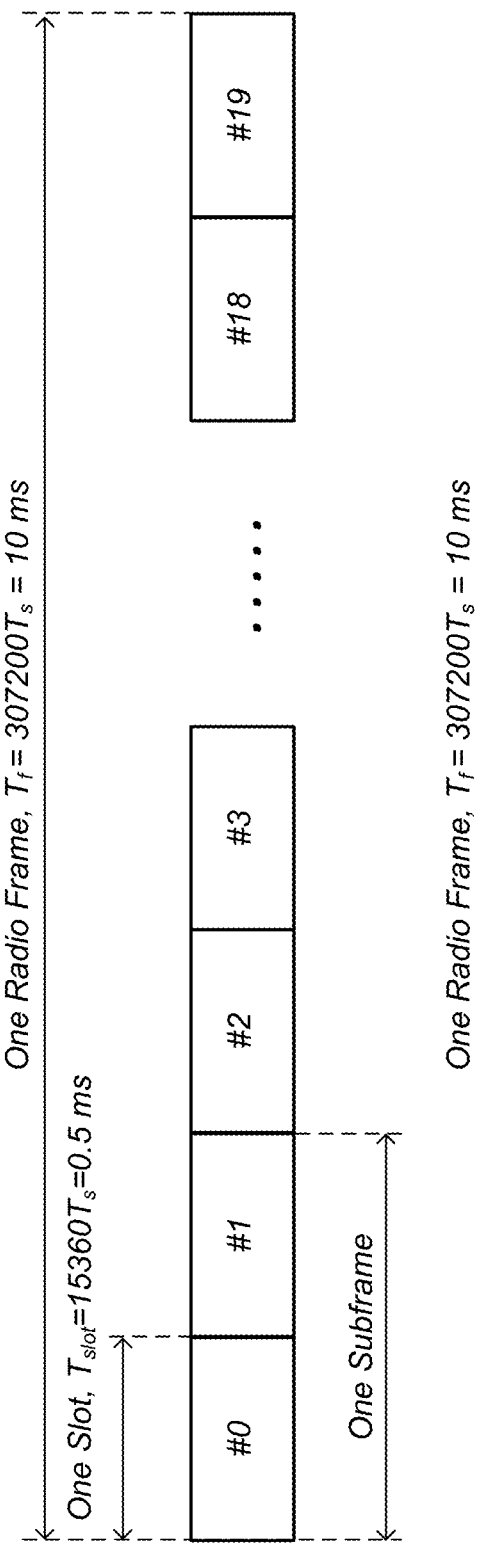
FIG. 6 shows a diagram illustrating an LTE FDD frame structure type 1, according to prior art.
Figure 7:
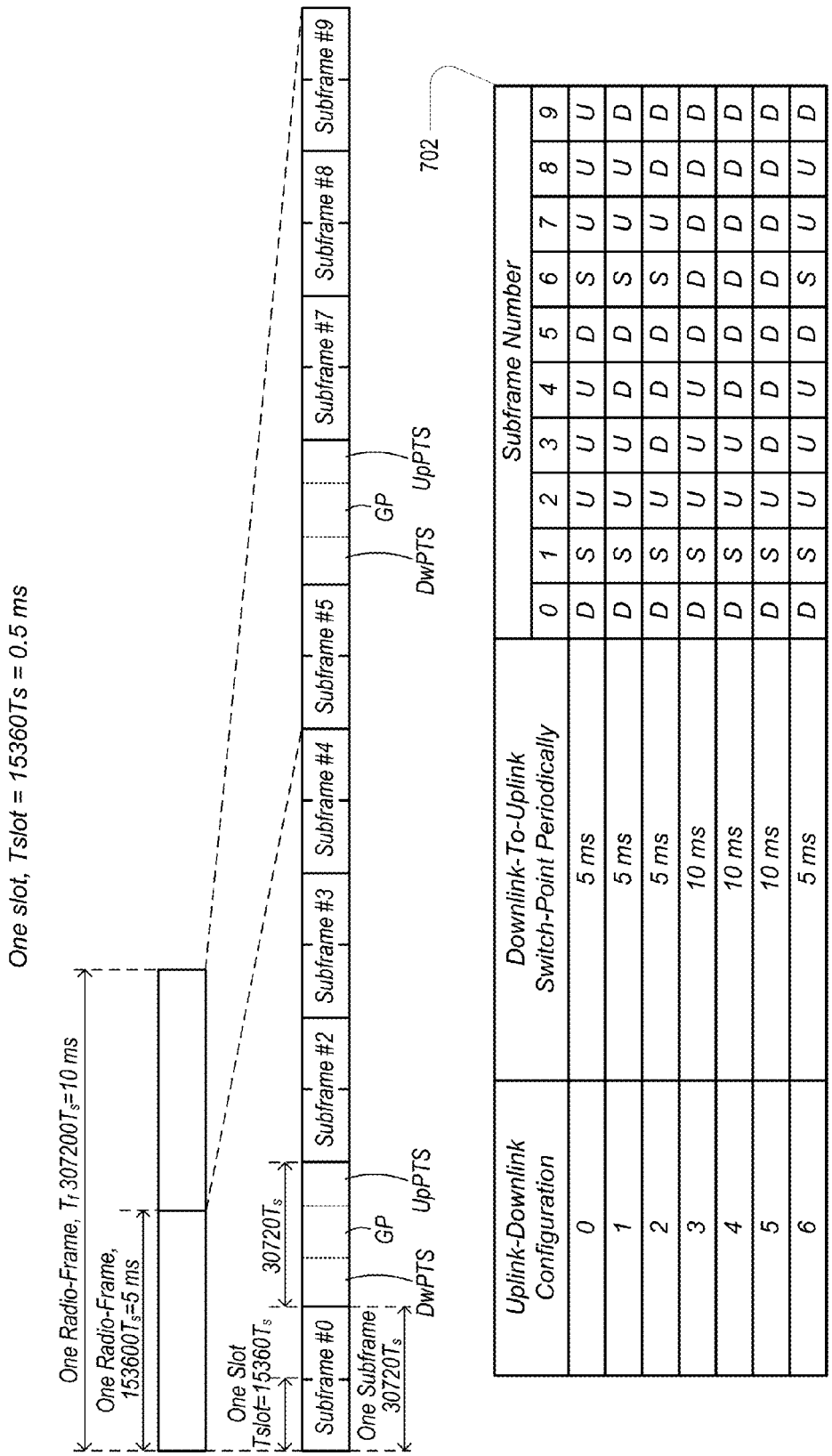
FIG. 7 shows a diagram illustrating an LTE TDD frame structure type 2, according to prior art.

FIGS. 6 and 7 show diagrams illustrating LTE frame structures (specifically for TS36.211). FIG. 6 shows a diagram illustrating the FDD LTE frame structure (Type 1) and FIG. 7 shows a diagram illustrating the TDD LTE frame structure (Type 2).

For the FDD (Frequency Division Duplex) LTE frame structure (FIG. 6), each frame is 10 ms and includes twenty slots where each slot is 0.5 ms. It is important to note that transmission of these FDD frames is continuous. Thus in both FDD uplink and downlink, the transmission of frames is continuous, and there cannot be any gaps between the frames, as this would cause the UEs and/or base stations to fail to recognize the frames. For the TDD LTE frame structure (FIG. 7), the frame is 10 ms and includes various subframes. Some of the subframes in a TDD LTE frame are uplink subframes and some of the subframes are downlink subframes. Each frame also contains a special subframe that comprises DwPTS, GP and UpPTS fields. The DwPTS field is part of the downlink and the UpPTS field is part of the uplink, and each of these fields carries control signals. The GP field is a "guard gap" between the DwPTS and UpPTS fields.

The DwPTS and the UpPTS fields operate to provide a list of the UL-DL configurations that are allowed, as shown in table 702 of FIG. 7. The table shows only Uplink-Downlink configurations 0 to 6, although there are additional configurations (not shown). As shown, for TDD LTE frames there will be both UL and DL frames in the same frequency. This is a major difference from the FDD frame structure illustrated in FIG. 6.

Figure 8:
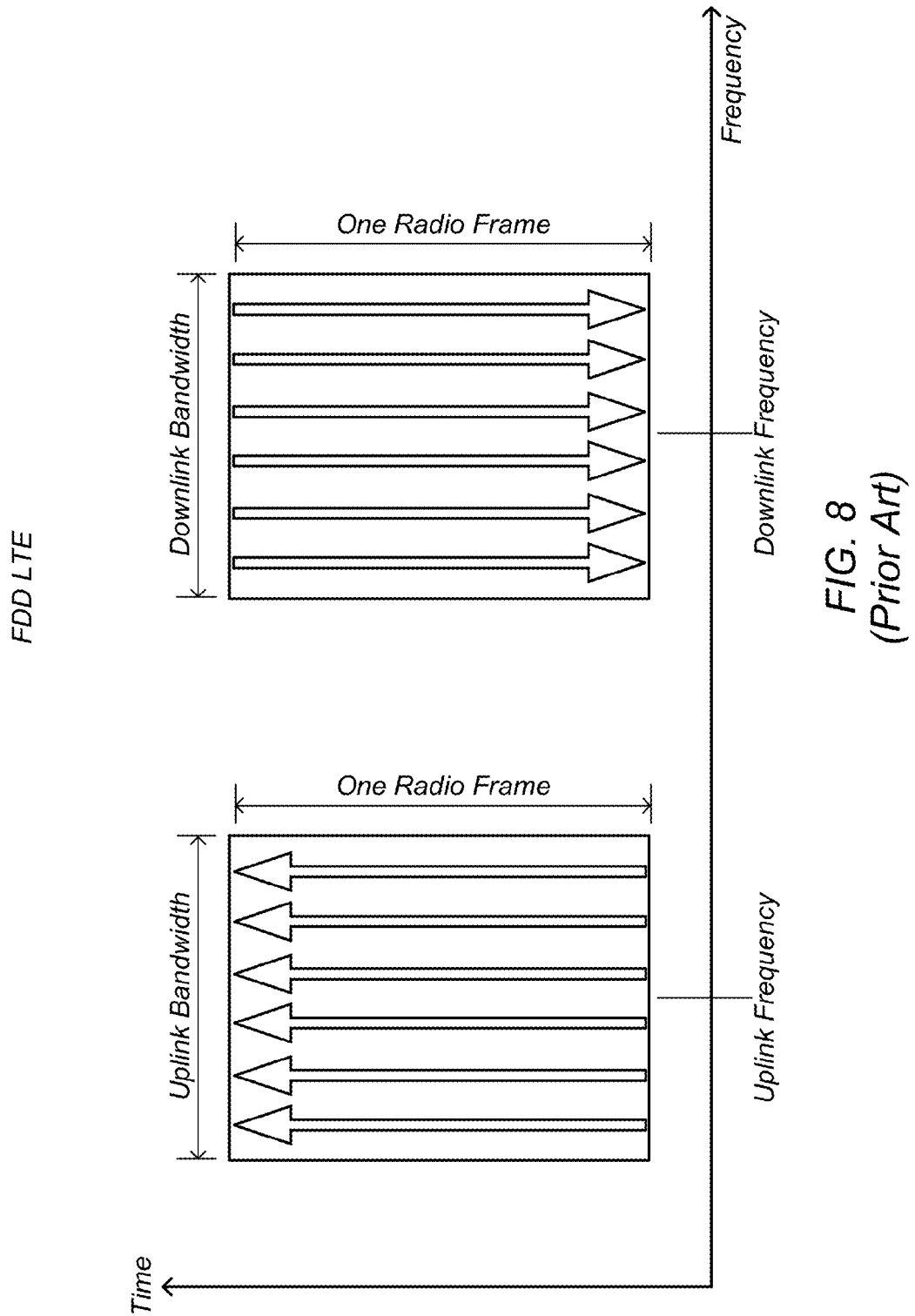
FIG. 8 shows a diagram illustrating the uplink (UL) and downlink (DL) frequencies and time slot arrangement of current LTE FDD in 3GPP, according to prior art.

FIG. 8—Current FDD LTE in 3GPP

FIG. 8 shows a diagram illustrating the current (prior art) operation of frequency division duplex (FDD) LTE in 3GPP. As illustrated in FIG. 8, for FDD LTE the frequency used for uplink communications is different than the frequency used for downlink communications. Also, the uplink bandwidth is equal to the downlink bandwidth (a 3GPP RAN4 restriction). Further, in FDD LTE, the uplink channel is continuously transmitting on the uplink frequency, and the downlink channel is continuously receiving on the downlink frequency. It should be noted that the vertical axis of the diagram represents the time elapsed during data (radio frame) communications, while the horizontal axis represents the frequencies at which data communications take place. The time period for the transmission of one single radio frame is indicated for both the uplink and downlink in FIG. 8. Representation of UL and DL communications is similarly shown in FIGS. 9-17, with the frequency bounds of various frequency bands indicated on the horizontal axis, and the time (elapsed) during communications within those frequency bands indicated on the vertical axis, with special indication provided for illustrating the time period (or elapsed time) for transmission of single radio frames.

Figure 9:
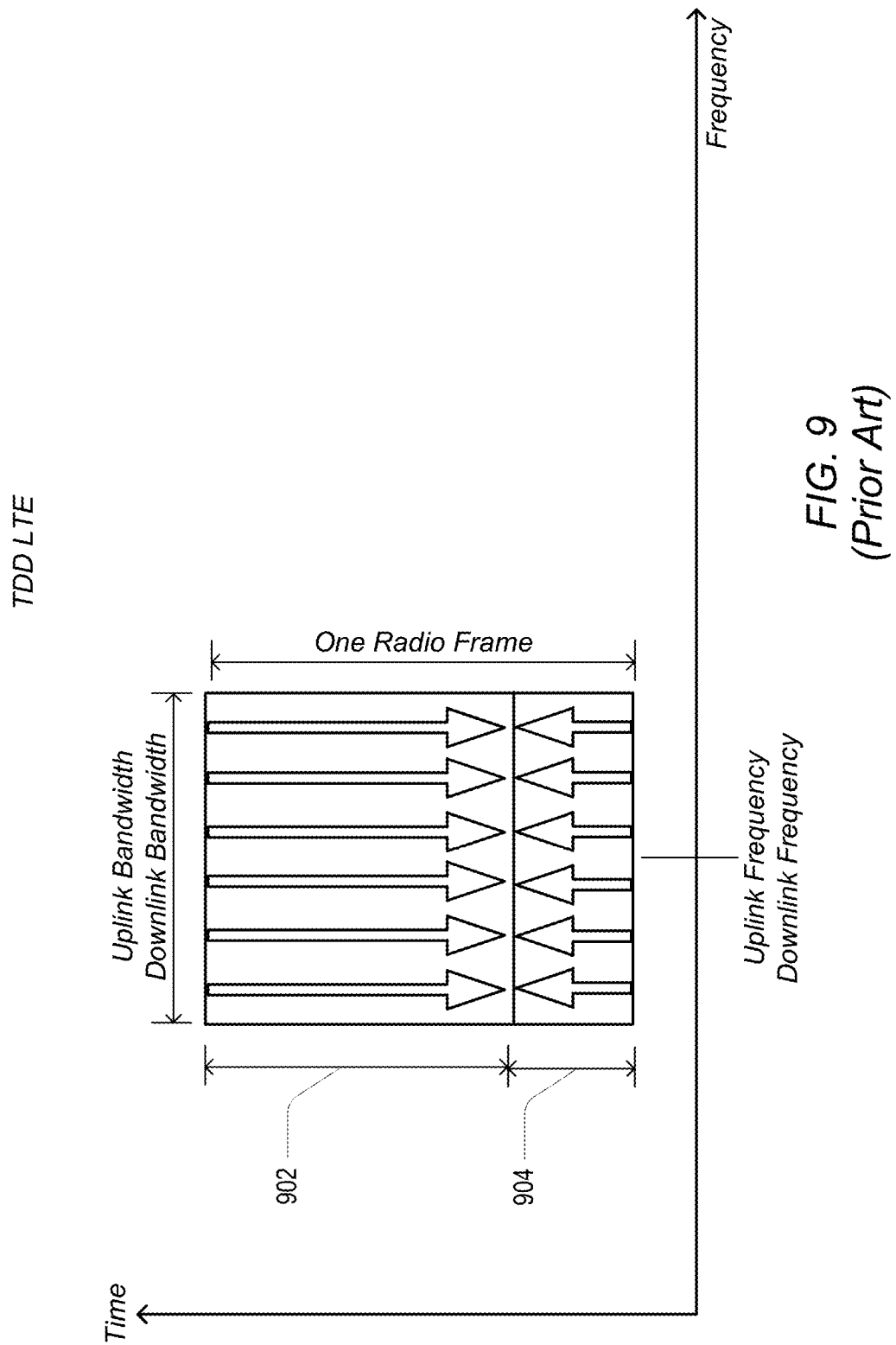
FIG. 9 shows a diagram illustrating the uplink (UL) and downlink (DL) frequencies and time slot arrangement of LTE TDD in 3GPP, according to prior art.

FIG. 9—Current TDD LTE in 3GPP

FIG. 9 shows a diagram illustrating the prior art operation of Time Division Duplex (TDD) LTE, also referred to as LT TDD. As shown, in TDD LTE the uplink channel and the downlink channel share the same frequency. Also, similar to FDD LTE, the uplink bandwidth is equal to the downlink bandwidth (again, due to the 3GPP RAN4 restriction). The uplink communication is performed on the common frequency during a first portion of the allotted time (904), while the downlink communication is performed on the common frequency during a second portion of the allotted time (902).

The amount of time for uplink vs. downlink (the ratio of uplink vs. downlink) may be determined by the uplink-downlink configuration shown in FIG. 7. Also, as indicated in FIG. 9, the allotted time is shown as the time (period) during which an entire radio frame is transmitted.

Problems with FDD-TDD Coexistence

Figure 10:
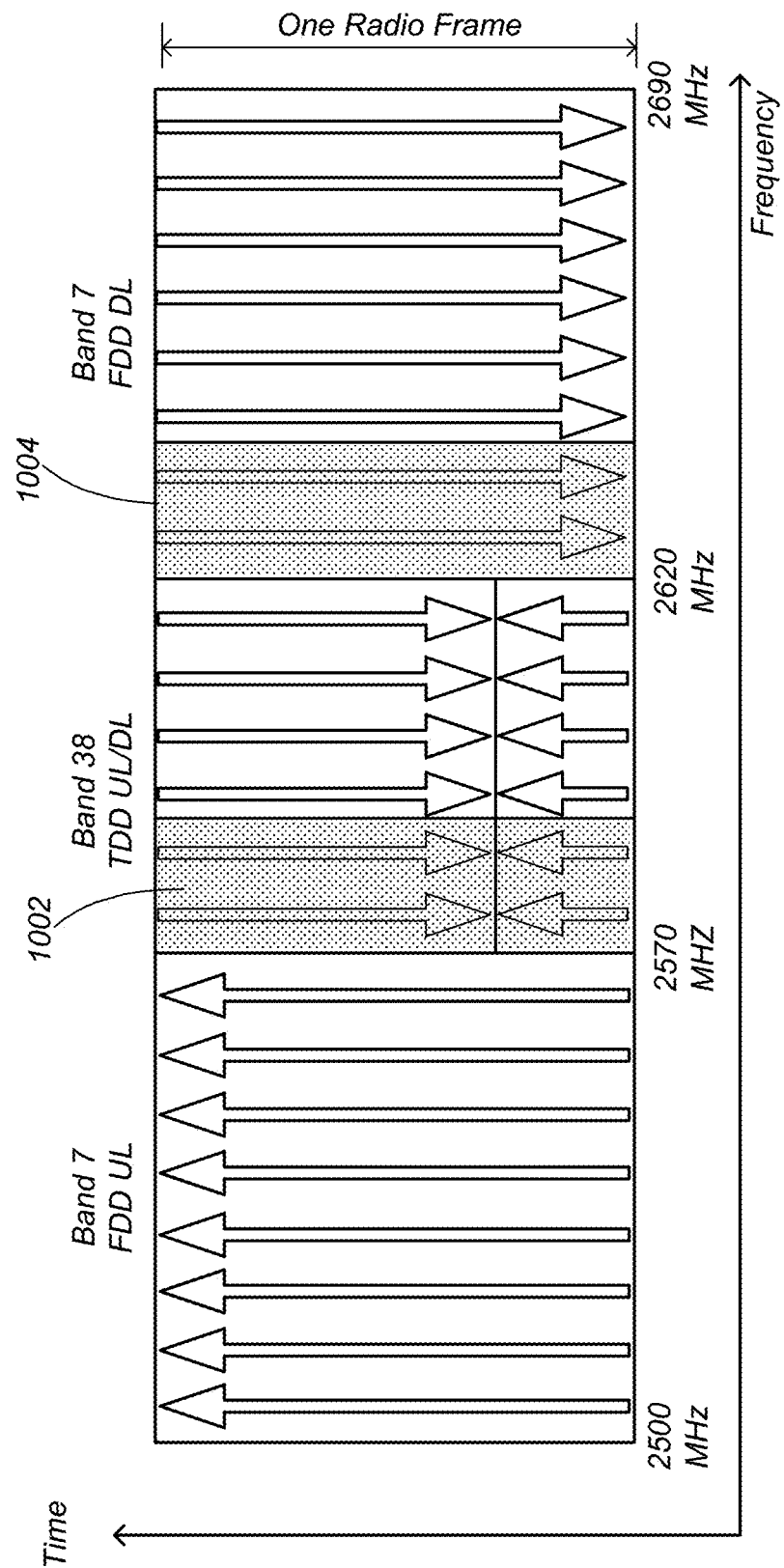
FIG. 10 shows a diagram illustrating LTE FDD-TDD coexistence with collision between FDD and TDD bands, highlighting coexistence between Band 7 and Band 38, according to prior art.

FIG. 10 shows a diagram illustrating FDD-TDD coexistence, highlighting the wasted bandwidth due to the use of guard bands for assuring minimal interference when FDD frames are transmitted alongside TDD frames. FIG. 10 shows an example of how FDD frames may be transmitted alongside TDD frames in adjacent bands, as practiced according to European standards, for example. FIG. 10 is meant to be representative of bandwidth characteristics for the general practice of FDD/TDD transmissions in adjacent bands, illustrated in FIG. 10 for LTE communications in Band 7 and Band 38. As shown in FIG. 10, two instances of FDD transmission take place in Band 7, these being FDD UL transmissions in Band 7 on the left between 2500 MHz and 2570 MHz, and an FDD DL transmission in Band 7 on the right between 2620 MHz and 2690 MHz. A TDD UL/DL transmission occurs in the middle between FDD Band 7 UL transmission on the left and FDD Band 7 DL transmission on the right, i.e., between 2570 MHz and 2620 MHz. Thus the TDD UL/DL transmissions in Band 38 bump up to the edges of both the Band 7 FDD UL transmission at 2570 MHz and the edge of the Band 7 FDD DL transmission at 2620 MHz. To put it another way, the FDD UL transmission in Band 7 occurs right up to the edge of the TDD UL/DL transmission in Band 38 at 2570 MHz, and the FDD DL transmission in Band 7 occurs right up to the edge of the TDD UL/DL transmission in Band 38 at 2620 MHz. In the absence of a guard band (a 20 MHz band illustrated by the hashed portion 1002 whose left edge begins at 2570 MHz and whose right edge ends at 2590 MHz between these channels), Band 38 TDD DL suffers from interference from the Band 7 FDD UL transmission. This interference causes Band 38 to be up to around 30 dB worse in terms of noise level, thus essentially preventing coexistence between the two respective UEs using these different bands. Also, in the absence of a guard band (a 20 MHz band shown by the hashed portion 1004 whose left edge begins at 2620 MHz and whose right edge ends at 2640 MHz), Band 7 FDD DL suffers from interference from the Band 38 TDD UL transmission. This interference causes the second Band 7 FDD DL to be up to around 30 dB worse in terms of noise level, thus essentially preventing coexistence between the two respective UEs using these different bands. Hence, when implementing the guard bands, the hashed portions (1002 and 1004) shown in FIG. 10 represent essentially collision and wasted frequency spectrum, since transmission in those regions of the bands would result in unacceptable interference.

Figure 11:
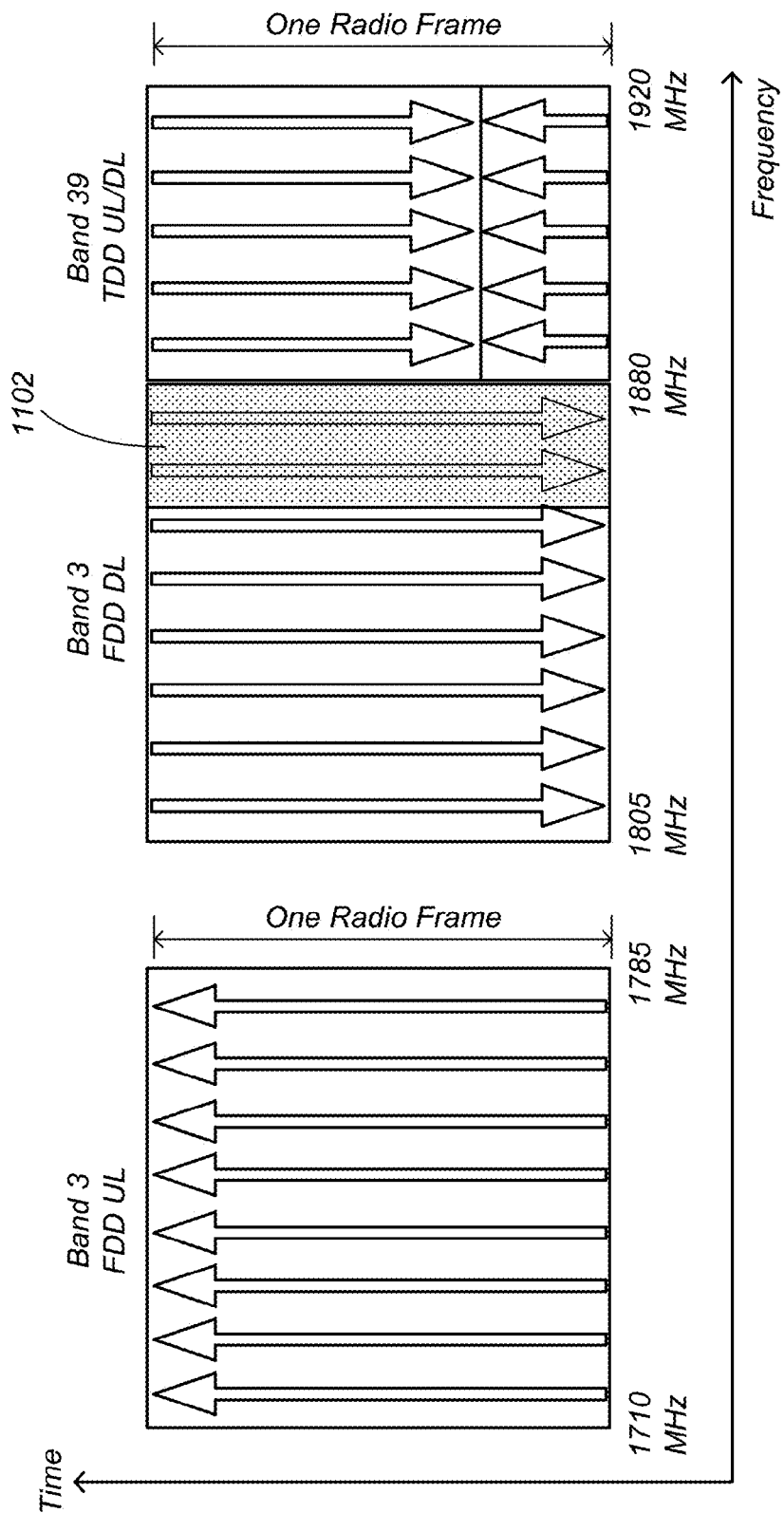
FIG. 11 shows a diagram illustrating LTE FDD-TDD coexistence with collision between FDD and TDD bands, highlighting coexistence between Band 3 and Band 39, according to prior art.

FIG. 11 shows a diagram illustrating FDD-TDD coexistence between Band 3 and Band 39 during signal transmission in those bands when the bands are adjacent to each other. As shown in FIG. 11, there is collision between FDD DL Band 3 and TDD UL Band 39. FIG. 11 illustrates an example of interference that could typically occur when wireless transmissions are practiced according to standards in China, for example. As shown, an FDD UL transmission takes place in Band 3 between 1710 and 1785 MHz, and an FDD DL transmission takes place in Band 3 between 1805 MHz and 1880 MHz. A TDD UL/DL transmission takes place in Band 39 between 1880 MHz and 1920 MHz. As shown, there is no guard band between the FDD DL transmission on Band 3 and the TDD UL/DL transmission on Band 39. Thus the TDD UL/DL transmission on Band 39 begins on the right edge of the Band 3 FDD DL transmission at 1880 MHz. Since there is no guard band between these channels, Band 3 FDD DL suffers from interference from the Band 39 TDD UL transmission, as shown by the hashed portion 1102 whose right edge is at 1880 MHz. This interference essentially prevents coexistence between the two respective UEs using these different bands.

Therefore, one current issue in some wireless communication systems, e.g. LTE systems in current 3GPP standards, is that whenever FDD and TDD UEs communicate on bands that are adjacent to each other, a 20 MHz guard band between those otherwise adjacent bands is required in order to guarantee the bands' coexistence. However, TDD LTE's limitation or restriction that "Uplink Frequency=Downlink Frequency" and "Uplink Bandwidth=Downlink Bandwidth" results in a waste of the UL time portion of the adjacent victim spectrum when it is not interfering. Similarly, FDD LTE's limitation or restriction that "Uplink is continuously transmitting" and "Downlink is continuously receiving" also wastes the uplink time portion of the adjacent victim spectrum when it is not interfering.

Pursuant to the above, the wireless transmissions (including uplink and downlink) during TDD LTE operations are presently characterized by the bandwidth of uplink communications and the bandwidth of downlink communications within a specified frequency band (e.g. within Band 39) being equal to each other, whether spanning the entire bandwidth allocated to the specified frequency band (as seen between 1880 MHz and 1920 MHz in FIG. 11), or spanning only a portion thereof (as seen between 2620 MHz and the right edge of guard band 1002 in FIG. 10). As illustrated in FIG. 10, with the presence of guard band 1002, only a portion of the entire bandwidth of frequency Band 38 is used for actual UL and DL communications, and the bandwidth of UL communications is equal to the bandwidth of DL communications. As illustrated in FIG. 11, the bandwidth of UL communications and the bandwidth of DL communications in frequency Band 39 are again equal to each other, with transmissions taking place over the entire allocated spectrum of Band 39 (between 1880 MHz and 1920 MHz).

Also pursuant to the above, the wireless transmissions (including uplink and downlink) during FDD LTE operations are presently characterized by communications within a specified frequency band (e.g. within Band 7) continuously taking place over the entire allocated communications bandwidth within the specified frequency band, whether spanning the entire bandwidth allocated to the specified frequency band (as seen between 2500 MHz and 2570 MHz in FIG. 10, as an example of FDD UL communications), or spanning only a portion thereof (as seen between 2690 MHz and the right edge of guard band 1004 in FIG. 10, as an example of FDD DL communications). As illustrated in FIG. 10, with the presence of guard band 1004, only a portion of the entire allocated bandwidth of frequency Band 7 is used for actual DL communications, and data transmission takes place during the entire time period allocated for a radio frame transmission.

First Set of Embodiments

Figure 12:
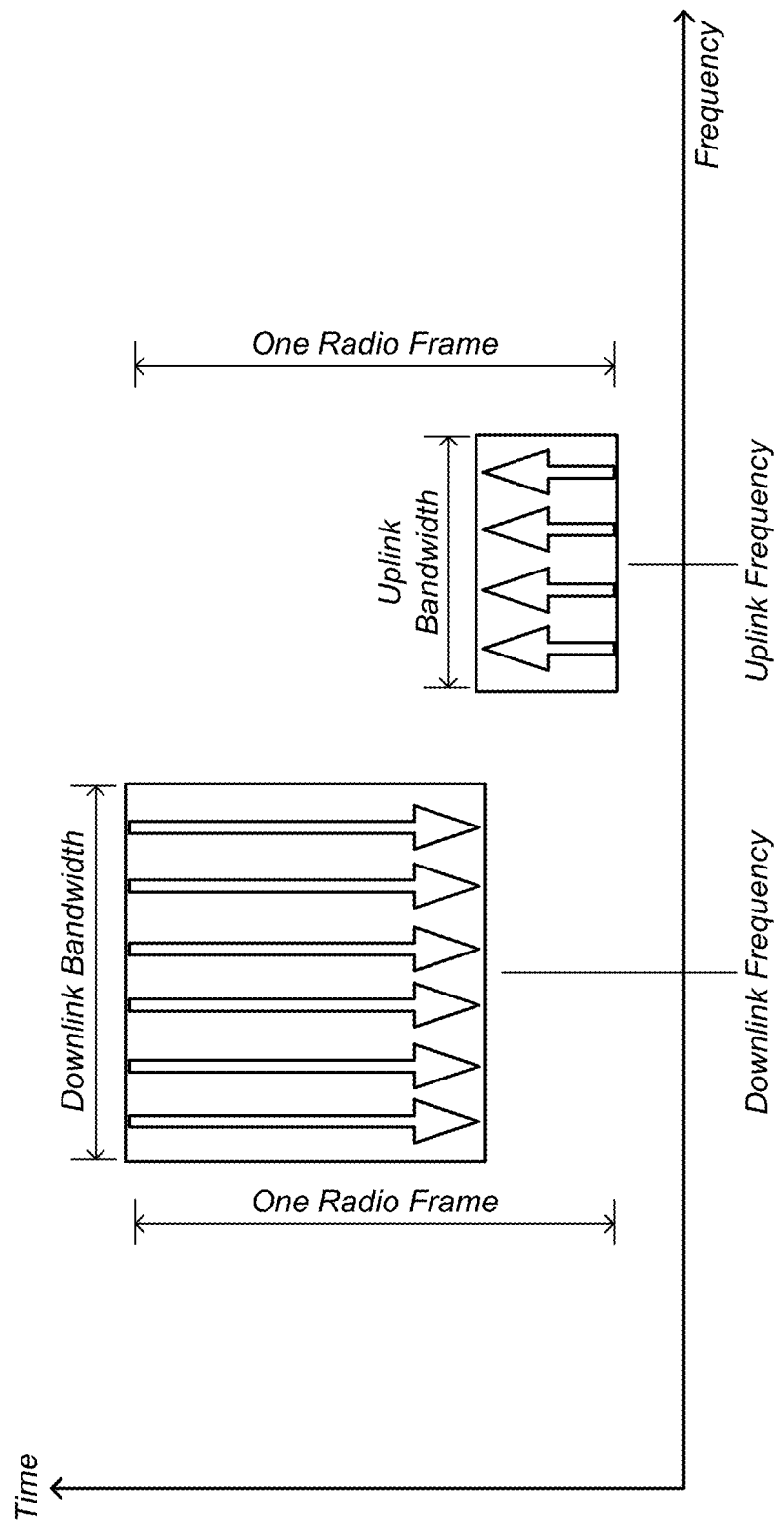
FIG. 12 shows a diagram illustrating an LTE TDD method according to some embodiments, in which the UL frequency does not equal the DL frequency, and where the UL bandwidth does not equal the DL bandwidth.

Therefore, according to a first set of embodiments, various implementations of wireless communications (also referred to herein as "the communication method") described herein introduce an asymmetric, independent TD LTE uplink band and downlink band, instead of using an identical single band for TD LTE uplink and TD LTE downlink. Furthermore, the TD-LTE uplink channel and downlink channel may be decoupled with different channel frequencies and bandwidth allocations. The TD-LTE uplink and TD-LTE downlink channels may be still paired up in usage, but the physical uplink and downlink channel frequency and bandwidth may be decoupled and made independent. The uplink and downlink channels do not need to be symmetrical, i.e., they may have different channel bandwidths and channel frequencies. For example, the uplink channel may use the 2570-2590 MHz range, while the downlink channel may use the 1880-1895 MHz range. FIG. 12 shows a diagram illustrating bandwidth and time allocation for LTE TDD communications according to one or more of the first set of embodiments. As shown in FIG. 12, the frequency used for uplink transmission is different from the frequency used for the downlink transmission, i.e., the UL frequency is different from the DL frequency. Also, the UL bandwidth does not equal the DL bandwidth. Referring back to FIGS. 10 and 11, and as will also be further illustrated below, a bandwidth for downlink communications within a specified TDD frequency band may be different from the bandwidth for uplink communications within the same specified frequency band, also resulting in at least some of the channel frequencies falling within the bandwidth for uplink communications in the specified frequency band differing from the frequencies falling within the bandwidth for downlink communications in the specified frequency band.

Second Set of Embodiments

Figure 13:
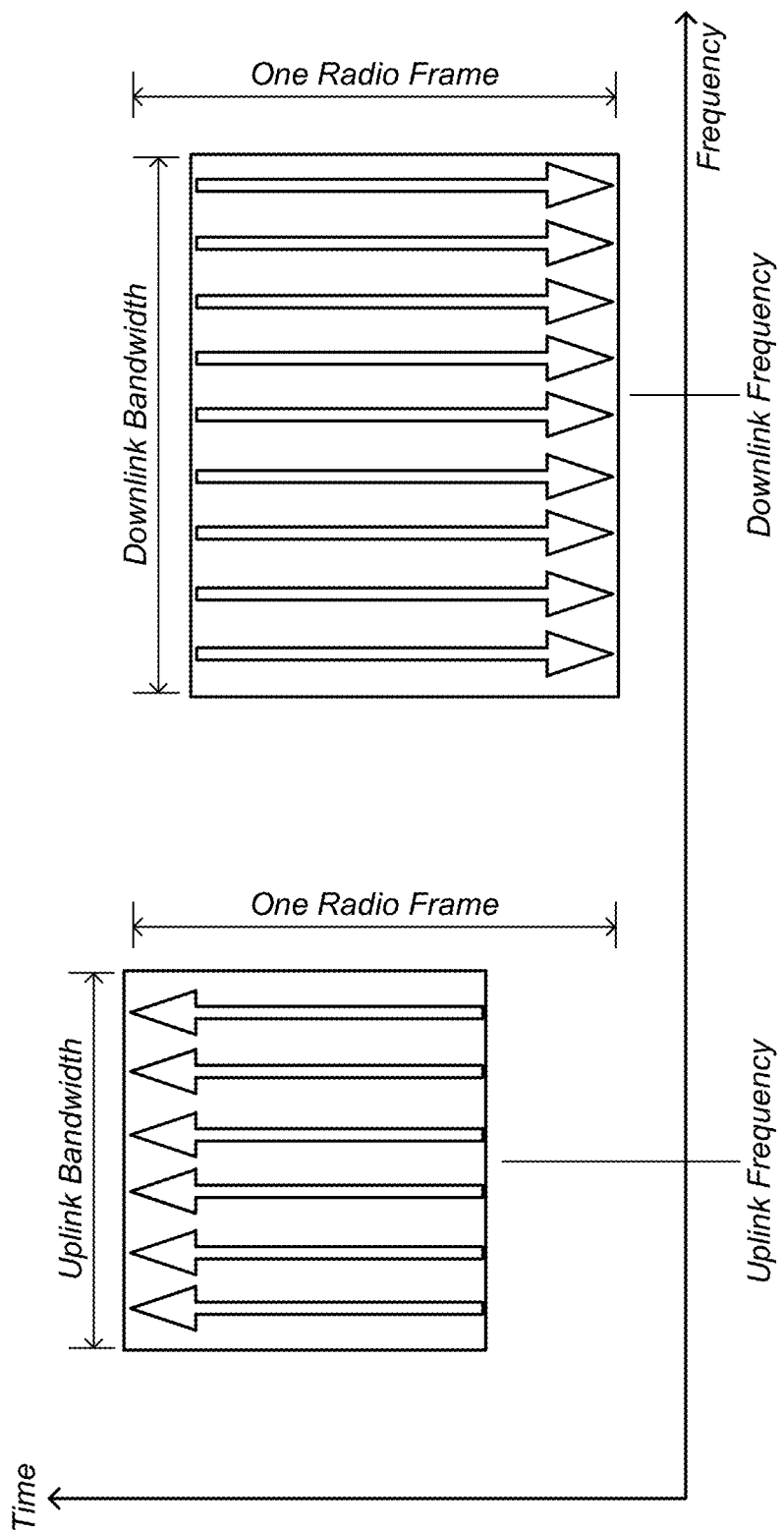
FIG. 13 shows a diagram illustrating an LTE FDD method according to some embodiments, in which the UL bandwidth does not equal the DL bandwidth, the UL is non-continuously transmitting, and the DL is non-continuously receiving.

According to a second set of embodiments, the FDD LTE's uplink channel and downlink channel may be decoupled with different channel bandwidth allocations. In this instance, "allocation" refers to the bandwidth and frequencies used for actual communications within the entire spectrum of the specified frequency band (e.g. within Band 3 or Band 7, etc.) A non-continuous frame structure for use in the FDD LTE's uplink channel and downlink channel (e.g., LTE Frame Structure 2) may also be introduced. FDD LTE's uplink and downlink channels may still be paired up in usage, but the physical time allocation now may be non-continuous for both the FDD LTE uplink channel and downlink channel. Furthermore, the FDD LTE uplink and downlink channels may not be required to be symmetrical, i.e., they may have different channel bandwidths. FIG. 13 shows a diagram illustrating time and bandwidth allocation for LTE FDD communications according to one or more of the second set of embodiments, where the UL bandwidth does not equal the DL bandwidth, and where the UL is non-continuously transmitting and the DL is non-continuously receiving with respect to the time period corresponding to one radio frame (or one subframe, as the case may be). Referring back to FIGS. 10 and 11, and as will also be further illustrated below, a bandwidth for downlink communications within a specified FDD frequency band (e.g. Band 7 or Band 3, etc.) may be different from the bandwidth for uplink communications within the same specified FDD frequency band. Furthermore, neither DL transmission nor UL transmission needs to be continuous during the time period corresponding to one radio frame (or one subframe, as the case may be). It should also be noted that while the examples provided for a specified data transmission period include a radio frame transmission period and a subframe transmission period, various embodiments are more generally directed to any specified data transmission period or specified wireless communications period.

Examples of the First Set of Embodiments and the Second Set of Embodiments

As previously mentioned, one key part of the communication method described herein is that neither the UL band nor the DL band need to be continuous. FIGS. 14-17 show diagrams illustrating operation of the UL and DL transmission scheme in a RAT, such as LTE according to some embodiments, showing a reduced amount of wasted bandwidth. The communication method may be used according to at least two different approaches. A first approach introduces a "victim restriction" (illustrated in FIGS. 14 and 15), while a second approach introduces an "aggressor restriction" (illustrated in FIGS. 16 and 17).

Figure 14:
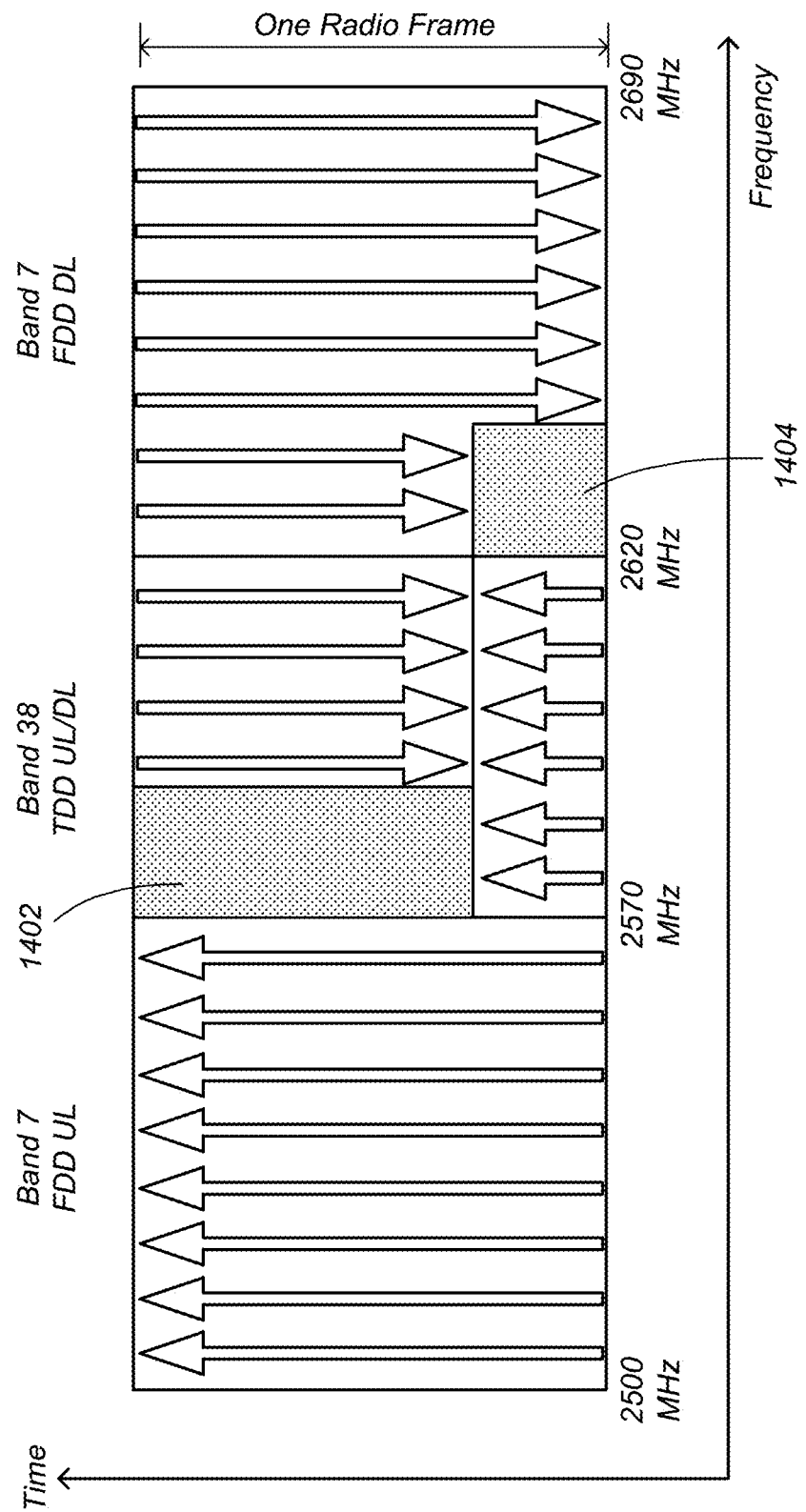
FIG. 14 shows a diagram illustrating operation of the UL and DL transmission with reduced collision and/or reduced wasted spectrum, highlighting victim restriction between Band 7 and Band 38 in an LTE communications system.

FIG. 14 shows a diagram illustrating operation of UL and DL transmission with reduced collision and/or reduced wasted spectrum, highlighting victim restriction between a first frequency band, Band 7, and a second frequency band, Band 38 in an LTE communication system. In the approach represented in FIG. 14, at least a portion of the Band 38 DL transmission in the TDD band adjacent to the Band 7 FDD UL band may be performed according to a communications bandwidth that begins at a slightly higher frequency, thus causing the UL and DL communication bandwidths in the TDD band to differ from each other. As illustrated in FIG. 14, Band 38 TDD is designated between 2570 MHz and 2620 MHz, and Band 7 FDD UL is designated between 2500 MHz and 2570 MHz. At least a portion of the Band 38 TDD DL adjacent to the Band 7 FDD UL is moved to a slightly higher frequency, causing the UL bandwidth of Band 38 to differ from the DL bandwidth of Band 38 by a frequency band 1402 (more specifically, the width of illustrated shaded area 1402 is representative of the guard band used for Band 38 DL transmissions, and is simply referenced as guard band 1402 in this instance). The full UL allocation of Band 38 may still be used because it is not interfering with the FDD UL transmissions in Band 7, as only the adjacent UL communications in Band 7 and DL communications in Band 38 interfere with each other (e.g. collisions would likely occur within frequency band 1402). A similar bandwidth adjustment may be made in Band 7 FDD DL, which is designated between 2620 MHz and 2690 Mhz, where the bandwidth of Band 7 FDD DL is adjusted only where the Band 7 FDD DL is adjacent to the UL portion of the Band 38 TDD bandwidth, the adjustment illustrated a guard band 1404 (where collisions would likely occur). Since interference occurs between Band 38 TDD UL and Band 7 FDD DL, and Band 38 TDD DL and Band 7 FDD UL, it is sufficient to make the bandwidth adjustments (guard bands 1402 and 1404) as shown in FIG. 14, in order to avoid interference. Thus, the required guard bands (1002 and 1004 shown in FIG. 10, for example) have been reduced in size, and therefore a smaller portion of the bandwidth is wasted.

Figure 15:
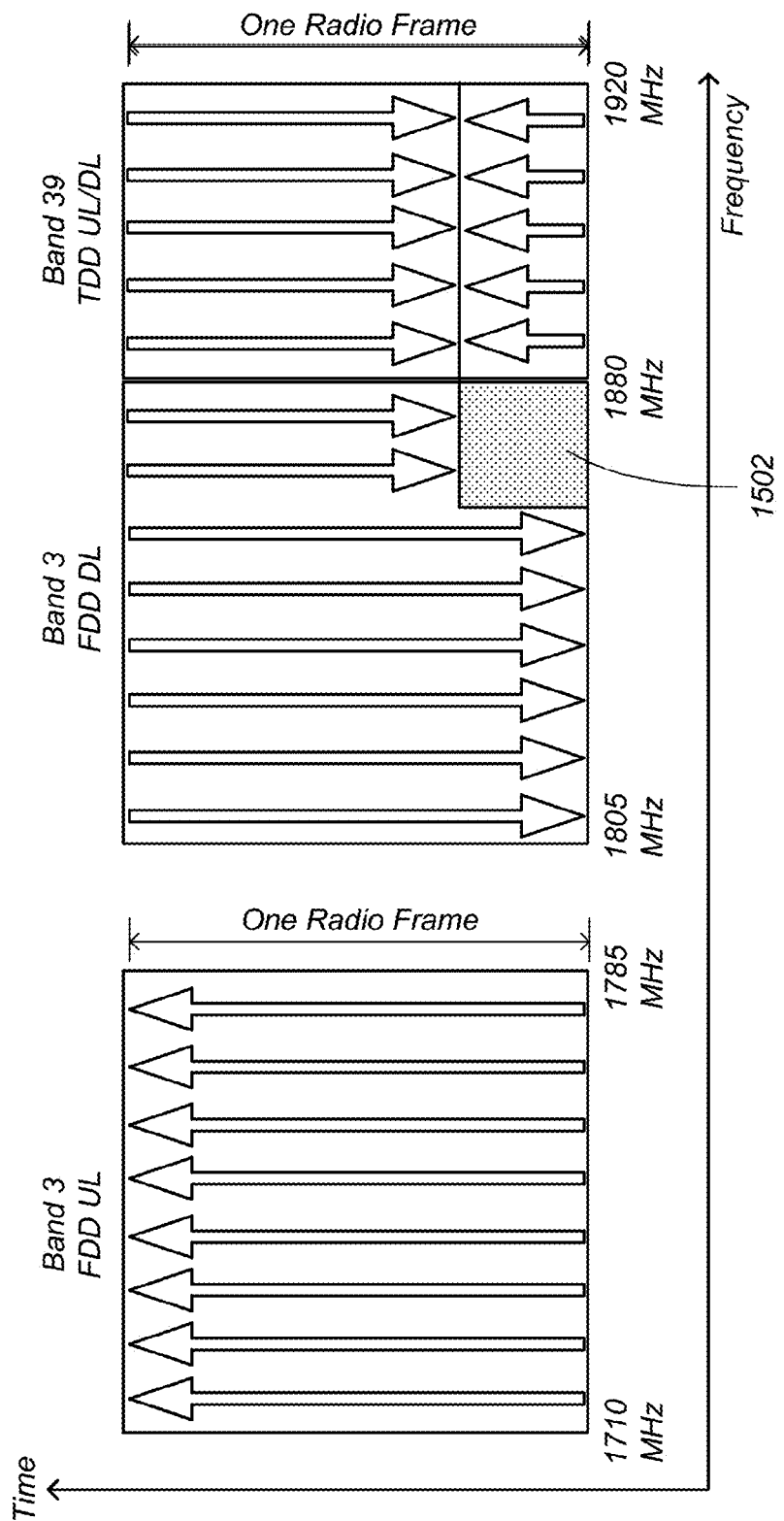
FIG. 15 shows a diagram illustrating operation of the UL and DL transmission with reduced collision and/or reduced wasted spectrum, highlighting victim restriction between Band 3 and Band 39 in an LTE communications system.

Similar adjustments may be made when Band 3 FDD DL communications take place adjacent to Band 39 TDD UL/DL communications, as exemplified in FIG. 15, which shows a diagram illustrating operation of the UL and DL transmission with reduced collision and/or reduced wasted spectrum, highlighting victim restriction between Band 3 and Band 39 in an LTE communication system. Thus, in FIG. 15, victim restriction is between Band 3 FDD DL (designated between 1805 MHz and 1880 MHz) and Band 39 TDD UL/DL (designated between 1880 MHz and 1920 MHz). Similar to the diagram shown in FIG. 14, interference is only between Band 3 FDD DL and Band 39 TDD UL. Thus, only the UL portion of the Band 39 TDD bandwidth adjacent to the Band 3 FDD DL bandwidth needs to be adjusted, shown as guard band 1502 (where packet collisions would likely occur). As seen in FIG. 15, because the time allocation for the UL portion of Band 39 TDD communications is lower than the time allocation for the DL portion of the Band 39 communications, even greater bandwidth savings may be realized with respect to the bandwidth savings realized in the example shown in FIG. 14. Thus, as shown in FIG. 15, the portion of the Band 3 FDD DL bandwidth adjacent to the Band 39 TDD UL bandwidth may be reduced to a slightly lower bandwidth extending to a frequency lower than 1880 MHz, causing the DL bandwidth of Band 3 to become narrower during that time period (i.e. during the time frame shared by the Band 3 FDD DL communications and the Band 39 TDD UL communications). The full DL allocation of Band 3 may still be used during the time frame shared with Band 39 TDD DL communications because it is not interfering with the TDD DL communications in Band 3, as only the adjacent DL communications in Band 3 and UL communications in Band 39 would interfere with each other. Thus, the required guard band 1502 required due to the collisions that would otherwise occur has been reduced in size (compared to guard band 1102 shown in FIG. 11, for example), and therefore a smaller portion of the bandwidth is wasted.

Figure 16:
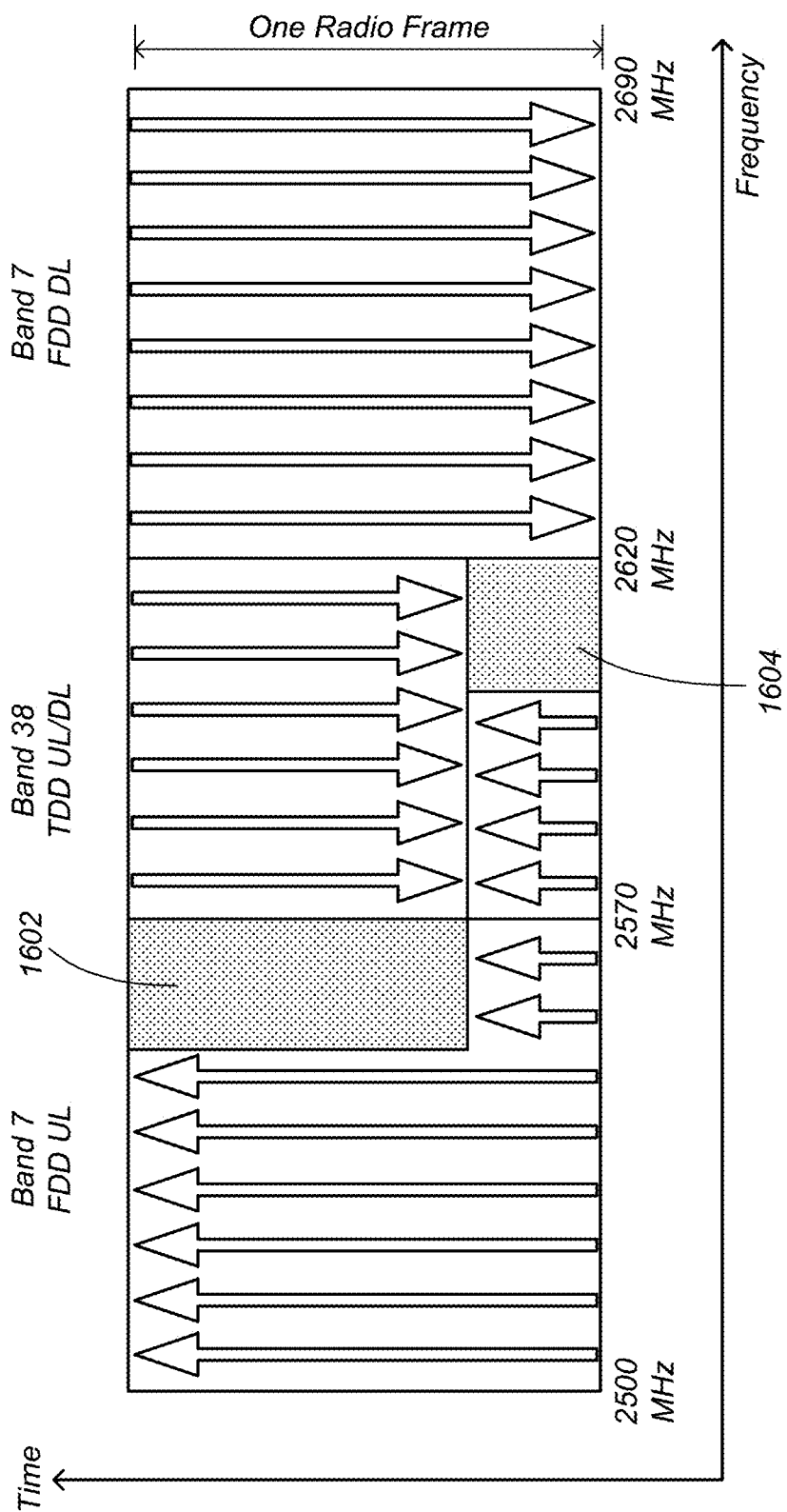
FIG. 16 shows a diagram illustrating operation of the UL and DL transmission with reduced collision and/or reduced wasted spectrum, highlighting aggressor restriction between Band 7 and Band 38 in an LTE communications system.
Figure 17:
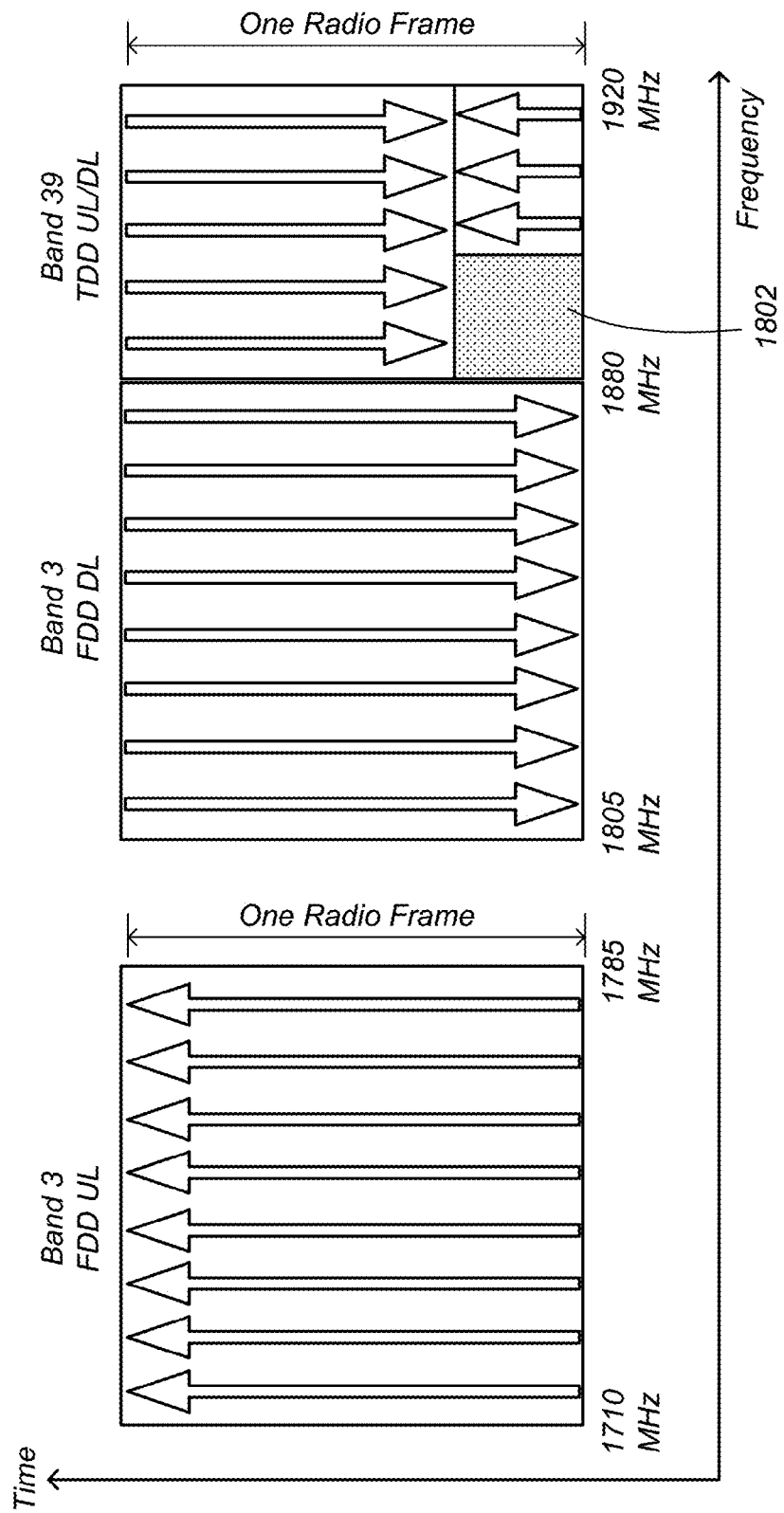
FIG. 17 shows a diagram illustrating operation of the UL and DL transmission with reduced collision and/or reduced wasted spectrum, highlighting aggressor restriction between Band 3 and Band 39 in an LTE communications system.

According to the second approach mentioned above, an aggressor restriction may be implemented, as illustrated in FIGS. 16 and 17. That is, instead of limiting the victim's specification, the aggressor may be specified to prevent transmission in certain portions of the band where it would be interfering with adjacent bands. This approach may have the added advantage that it is typically the approach taken in establishing the current standards. Again, restriction is only required when UL transmissions are taking place in a band adjacent to a band in which DL transmissions are taking place. UL adjacent to UL and DL adjacent to DL don't interfere with each other.

As shown in FIG. 16, the bandwidth of Band 7 FDD UL (designated between 2500 MHz and 2570 MHz) may be narrowed when it would otherwise be adjacent to Band 38 TDD (designated between 2570 MHz and 2620 MHz) DL. However, the bandwidth of Band 7 FDD UL adjacent to Band 38 TDD UL does not need to be adjusted. In other words, FDD UL transmissions in Band 7 are prevented from taking place when they would be adjacent to TDD DL communications in Band 38, designated by guard band 1602. Similarly, the bandwidth of Band 38 TDD UL may be narrowed when it would otherwise be adjacent to Band 7 FDD DL (designated between 2620 MHz and 2690 MHz). However, the bandwidth of Band 38 TDD UL adjacent to Band 7 FDD UL does not need to be adjusted. In other words, TDD UL transmissions in Band 38 are prevented from taking place when they would be adjacent to FDD DL communications in Band 7, as indicated by guard band 1604.

Similar adjustments may be made when Band 3 FDD DL (designated between 1805 MHz and 1880 MHz) communications take place adjacent to Band 39 TDD (designated between 1880 MHz and 1920 MHz) UL/DL communications, as illustrated in FIG. 17. As shown in FIG. 17, the bandwidth of Band 39 TDD UL may be narrowed when it would otherwise be adjacent to Band 3 FDD DL. In other words, TDD UL transmissions in Band 39 are prevented from taking place when they would be adjacent to FDD DL communications in Band 3, as indicated by guard band 1802.

Some Embodiments of a Communication Method that Reduces Wasted Bandwidth

Figure 18:
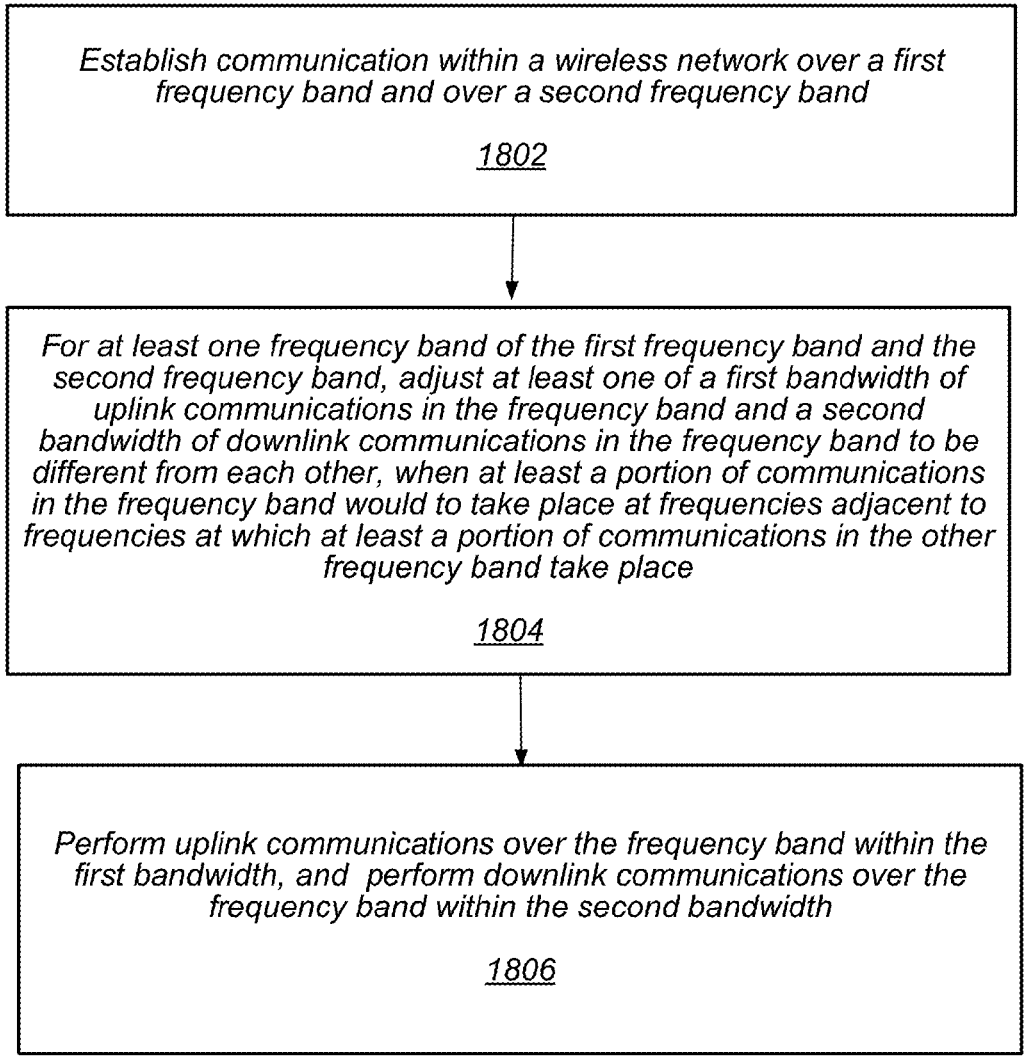
FIG. 18 shows a flowchart diagram illustrating communication in a wireless communications system while preserving bandwidth, according to some embodiments.

FIG. 18 shows a flowchart diagram illustrating some embodiments of a communication method in which UL and DL communications are selectively decoupled to reduce wasted bandwidth while also preventing packet collisions. As shown in FIG. 18, communications may be established within a wireless network over a first frequency band and over a second frequency band (1802). The first frequency band and the second frequency band may not overlap, but they may be adjacent to each other. Examples of such frequency bands are shown in at least FIGS. 14-18. For example, the first frequency band may be LTE Band 3 and the second frequency band may be LTE Band 39, or the first frequency band may be LTE Band 7 and the second frequency band may be LTE Band 38. In other embodiments the frequency bands may be different. For at least one frequency band of the first frequency band and the second frequency band, at least one of a first bandwidth of uplink communications in the frequency band and a second bandwidth of downlink communications in the frequency band may be adjusted such that the first bandwidth is different from the second bandwidth, when at least a portion of communications in the frequency band would to take place at frequencies adjacent to frequencies at which at least a portion of communications take place in the other frequency band (1804). Uplink communications in the frequency band may then be performed within the first bandwidth, and downlink communications in the frequency band may be performed within the second bandwidth (1806).

Figure 19:
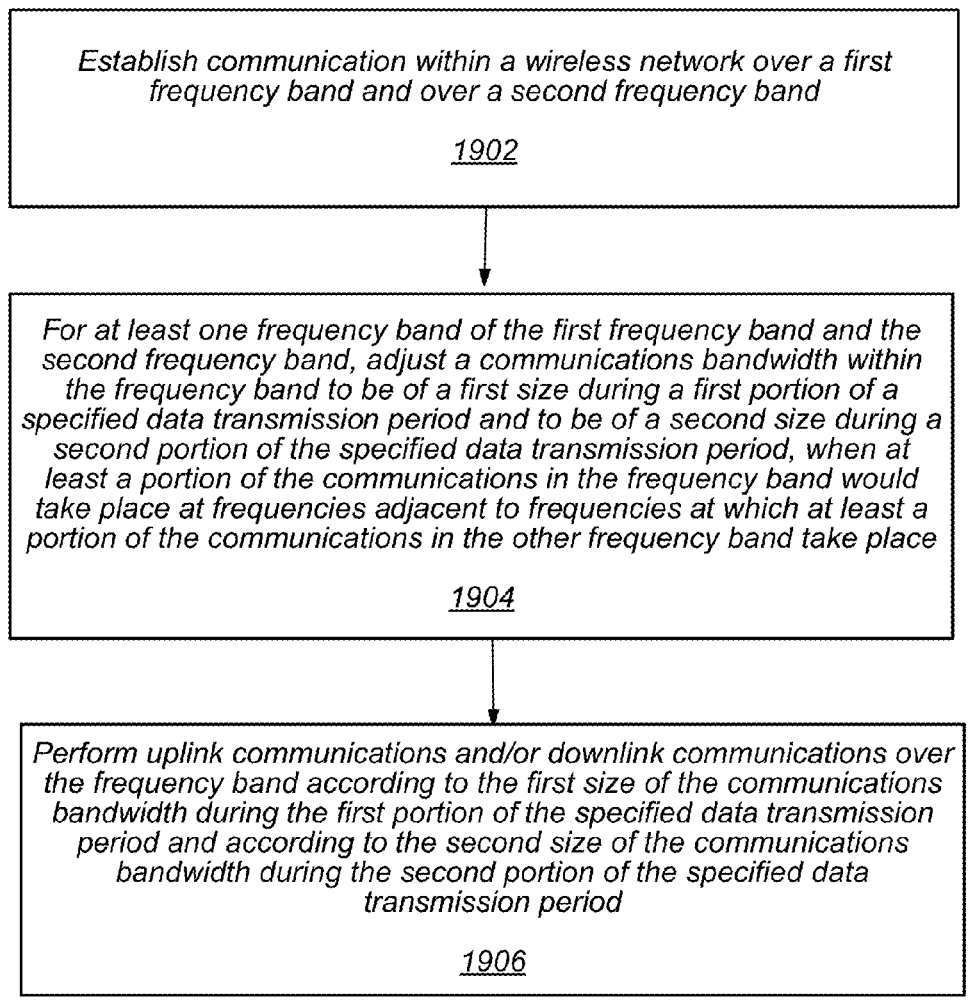
FIG. 19 shows a flowchart diagram illustrating communication in a wireless communications system while preserving bandwidth, according to some embodiments.

Some Additional Embodiments of a Communication Method that Reduces Wasted Bandwidth FIG. 19 shows a flowchart diagram illustrating some additional embodiments of a communication method in which UL and DL communications are selectively decoupled to reduce wasted bandwidth while also preventing packet collisions. As shown in FIG. 19, communications may be established within a wireless network over a first frequency band and over a second frequency band (1902). Again, the first frequency band and the second frequency band may not overlap, but they may be adjacent to each other. Examples of such frequency bands are shown in at least FIGS. 14-18. For example, the first frequency band may be LTE Band 3 and the second frequency band may be LTE Band 39, or the first frequency band may be LTE Band 7 and the second frequency band may be LTE Band 38. In other embodiments the frequency bands may be different. For at least one of the first frequency band and the second frequency band, a communications bandwidth within the frequency band may be adjusted to be of a first size during a first portion of a specified communications period or data transmission period (e.g. during a radio frame transmission period) and to be of a second size during a second portion of the specified communications period or data transmission period (e.g. the radio frame transmission period), when at least a portion of the communications in the frequency band would to take place at frequencies adjacent to frequencies at which at least a portion of communications take place in the other frequency band (1904). Uplink communications and/ or downlink communications over (or in) the frequency band may then be performed according to the first size of the communications bandwidth during the first portion of the radio frame transmission and according to the second size of the communications bandwidth during the second portion of the radio frame transmission (1906). To put it another way, uplink communications and/or downlink communications may not take place continuously within the entire allocated bandwidth of the frequency band, and may take place over a first size bandwidth during a first portion of a specified data transmission period, and over a second size bandwidth during a second portion of the specified data transmission period. In some embodiments the second portion of the specified communications period may encompass the remainder, or remaining portion of the specified data transmission period.

Advantages of the Disclosed Communication Methods

Overall, various embodiments of mobile devices operating with base stations and/or relay stations according to the disclosed communication methods guarantees coexistence of adjacent bands without any problems. Current configurations waste close to one half of the entire spectrum, whereas various embodiments disclosed herein may recover a significant portion of that bandwidth. Using the disclosed embodiments, new TD-LTE uplink and downlink channels may be easily reconfigured to accommodate their own corresponding deployment requirements to maximize the frequency spectrum usage without posing unnecessary restrictions due to the binding of channel frequencies and channel bandwidths for uplink and downlink in current TD-LTE specifications.

Similarly, the proposed new non-continuous FDD LTE frame structure and asymmetric uplink and downlink channel bandwidths provide a great flexibility in FDD LTE configuration to maximize the frequency spectrum usage without posing unnecessary restrictions due to the current time continuous nature of uplink and downlink transmissions, and the binding of channel bandwidths for uplink and downlink in current FDD LTE specifications.

Proposed embodiments may also save at least 50% of the frequency spectrum wasted between the adjacent channels, either on TDD side or FDD side. They also provide a satisfactory coexistence between UEs with adjacent bands according to 3GPP's default −50 dBm/MHz spurious level, without requiring any relaxation. There may further be no need to change current 3GPP frequency band plans, as channel level decoupling and frame structure addition may suffice. Finally, there may be no need to change current hardware filter technologies in at least embodiments that are implemented through software. However, embodiments disclosed herein may also include hardware implementations or a combination of hardware/software implementations.

Impact of Disclosed Embodiments

Embodiments implemented according to the descriptions provided herein may have an impact on network synchronization. More specifically, network synchronization may be used to implement time synchronization between adjacent interfering TDD and FDD networks. There may also be an impact on UE implementations. Specifically, independent UE transmit band and receive band filters may be used to address different filter bandwidths for transmit and receive bands. Since, according to the present standards, the UL and DL bands are identical, a single filter may be used in UE devices, and the single filter may be multiplexed for use in either the transmit path (for UL) of the receive path (for DL). However, when the UL and DL bands are not of identical width, separate filters may be used for the transmit path and the receive path.

Various embodiments implemented according to the descriptions disclosed herein may also have an impact on the 3GPP Specification. Various 3GPP RAN1 specification changes may be implemented for TDD LTE (channel reciprocity, enabling/disabling certain TDD TMs (TM7/8/9) with and without interference), and FDD LTE (HARQ timing, CSI measurement and reporting, and control channel timing relations due to non-continuous FDD). Changes may also be implemented in the 3GPP RAN2 specification regarding separation of TD LTE uplink channel and downlink channel frequencies. In addition, changes may also be implemented in the 3GPP RAN4 specification in TD LTE band table and related tables, along with allowance of new specifications of different uplink and downlink channel bandwidths. Relevant demodulation test cases may be added as well.

The embodiments disclosed herein may be realized in any of various forms. For example, in some embodiments, some embodiments may be realized as a computer-implemented method, a computer-readable memory medium, or a computer system. Other embodiments may be realized using one or more custom-designed hardware devices such as ASICs. Yet other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for conserving bandwidth during transmission of wireless signals in adjacent frequency bands, the method comprising:

establishing communication within a wireless network over at least three different specified frequency bands;

adjusting, for a first specified frequency band of the at least three specified frequency bands, one of a first bandwidth of uplink communications in the first specified frequency band or a second bandwidth of downlink communications in the first specified frequency band, such that the first bandwidth differs from the second bandwidth when at least a first portion of communications over the first specified frequency band takes place at frequencies adjacent to frequencies at which at least a corresponding portion of communications over a second specified frequency band of the at least three different specified frequency bands takes place; and adjusting, for a third specified frequency band of the at least three specified frequency bands, for a specified time period, a third bandwidth of communications taking place in the third specified frequency band at frequencies adjacent to frequencies at which at least a second portion of communications over the first specified frequency band takes place, wherein the specified time period corresponds to a communication time period during which the first bandwidth and the second bandwidth are not adjusted.

2. The method of claim 1, further comprising at least one of:

performing uplink communications over the first specified frequency band according to the first bandwidth; or performing downlink communications over the first specified frequency band according to the second bandwidth.

3. The method of claim 1, wherein adjusting the one of the first bandwidth of uplink communications in the first specified frequency band or the second bandwidth of downlink communications in the first specified frequency band comprises one of:

decreasing the first bandwidth when the second bandwidth is unchanged; or decreasing the second bandwidth when the first bandwidth is unchanged.

4. The method of claim 1, wherein the first specified frequency band is a time division duplex (TDD) frequency band, the second specified frequency band is a first frequency division duplex (FDD) frequency band, and the third specified frequency band is a second FDD frequency band.

5. The method of claim 4, wherein adjusting the one of the first bandwidth of uplink communications in the first frequency band or the second bandwidth of downlink communications in the first frequency band comprises one of:

decreasing the second bandwidth when at least a portion of downlink communications over the TDD frequency band takes place at frequencies adjacent to frequencies at which at least a portion of uplink communications takes place over the first FDD frequency band; or decreasing the first bandwidth when at least a portion of uplink communications over the TDD frequency band takes place at frequencies adjacent to frequencies at which at least a portion of downlink communications takes place over the first FDD frequency band.

6. The method of claim 4, wherein adjusting the third bandwidth of communications comprises one of:

decreasing a downlink communications bandwidth in the second FDD frequency band when at least a portion of downlink communications over the second FDD frequency band takes place at frequencies adjacent to frequencies at which at least a portion of uplink communications takes place over the TDD frequency band; or decreasing an uplink communications bandwidth in the second FDD frequency band when at least a portion of uplink communications over the second FDD frequency band takes place at frequencies adjacent to frequencies at which at least a portion of downlink communications takes place over the TDD frequency band.

7. The method of claim 1, further comprising at least one of:

leaving the first bandwidth unadjusted, when uplink communications over the first specified frequency band take place at frequencies adjacent to frequencies at which uplink communications take place over the second specified frequency band; or leaving the second bandwidth unadjusted, when downlink communications over the first specified frequency band take place at frequencies adjacent to frequencies at which downlink communications take place over the second specified frequency band.

8. A wireless communication device comprising:

radio circuitry configured to establish communication within a wireless network over a first specified frequency band, a second specified frequency band and a third specified frequency band, wherein the first specified frequency band comprises a first bandwidth of uplink communications and a second bandwidth of downlink communications; and a processing element configured to:

adjust one of the first bandwidth or the second bandwidth, such that the first bandwidth differs from the second bandwidth when at least a first portion of communications in the first specified frequency band takes place at frequencies adjacent to frequencies at which at least a corresponding portion of communications over the second specified frequency band takes place; and adjust, for a specified time period, the third bandwidth when communications take place in the third specified frequency band at frequencies adjacent to frequencies at which at least a second portion of communications over the first specified frequency band take place, wherein the specified time period corresponds to a communication time period during which the first bandwidth and the second bandwidth are not adjusted.

9. The wireless communication device of claim 8, wherein the processing element is configured to interoperate with the radio circuitry to cause the wireless communication device to perform at least one of:

uplink communications over the first specified frequency band according to the first bandwidth; and downlink communications over the first specified frequency band according to the second bandwidth.

10. The wireless communication device of claim 8, wherein in adjusting the one of the first bandwidth of uplink communications in the first specified frequency band or the second bandwidth of downlink communications in the first specified frequency band, the processing element is configured to perform one of:

decrease the first bandwidth when the second bandwidth is unchanged; or decrease the second bandwidth when the first bandwidth is unchanged.

11. The wireless communication device of claim 8, wherein the first specified frequency band is a time division duplex (TDD) frequency band, and the second specified frequency band is a frequency division duplex (FDD) frequency band, and wherein in adjusting the one of the first bandwidth of uplink communications in the first specified frequency band or the second bandwidth of downlink communications in the first specified frequency band, the processing element is configured to perform one of:

decrease the second bandwidth when at least a portion of downlink communications over the TDD frequency band takes place at frequencies adjacent to frequencies at which at least a portion of uplink communications takes place over the FDD frequency band; and decrease the first bandwidth when at least a portion of uplink communications over the TDD frequency band takes place at frequencies adjacent to frequencies at which at least a portion of downlink communications takes place over the FDD frequency band.

12. The wireless communication device of claim 8, wherein the first frequency band is a time division duplex (TDD) frequency band, and the third frequency band is a frequency division duplex (FDD) frequency band, and wherein the processing element is configured to perform one of:

decrease a downlink communications bandwidth in the FDD frequency band when at least a portion of downlink communications over the FDD frequency band takes place at frequencies adjacent to frequencies at which at least a portion of uplink communications takes place over the TDD frequency band; or decrease an uplink communications bandwidth in the FDD frequency band when at least a portion of uplink communications over the FDD frequency band takes place at frequencies adjacent to frequencies at which at least a portion of downlink communications takes place over the TDD frequency band.

13. The wireless communication device of claim 8, wherein the processing element is configured to perform one of:

leave the first bandwidth unadjusted, when uplink communications over the first frequency band take place at frequencies adjacent to frequencies at which uplink communications takes place over the second frequency band; or leave the second bandwidth unadjusted, when downlink communications over the first frequency band take place at frequencies adjacent to frequencies at which downlink communications take place over the second frequency band.

14. An apparatus comprising:

a processing element configured to cause a wireless communication device to:

communicate within a wireless network over a first specified frequency band, a second specified frequency band and a third specified frequency band, wherein the first specified frequency band comprises a first bandwidth of uplink communications and a second bandwidth of downlink communications;

adjust one of the first bandwidth or the second bandwidth, such that the first bandwidth differs from the second bandwidth when at least a first portion of communications in the first specified frequency band takes place at frequencies adjacent to frequencies at which at least a corresponding portion of communications over the second specified frequency band takes place; and adjust, for a specified time period, the third bandwidth when communications take place in the third specified frequency band at frequencies adjacent to frequencies at which at least a second portion of communications over the first specified frequency band take place, wherein the specified time period corresponds to a communication time period during which the first bandwidth and the second bandwidth are not adjusted.

15. The apparatus of claim 14, wherein the processing element is configured to further cause the first wireless communications device to perform at least one of:

uplink communications over the first specified frequency band according to the first bandwidth; or downlink communications over the first specified frequency band according to the second bandwidth.

16. The apparatus of claim 14, wherein the processing element is configured to further cause the first wireless communications device to perform one of:

decrease the first bandwidth when the second bandwidth is unchanged; or decrease the second bandwidth when the first bandwidth is unchanged.

17. The apparatus of claim 14, wherein the first specified frequency band is a time division duplex (TDD) frequency band, and the second specified frequency band is a frequency division duplex (FDD) frequency band, and wherein the processing element is configured to further cause the first wireless communications device to perform one of:

decrease the second bandwidth when at least a portion of downlink communications over the TDD frequency band takes place at frequencies adjacent to frequencies at which at least a portion of uplink communications takes place over the FDD frequency band; or decrease the first bandwidth when at least a portion of uplink communications over the TDD frequency band takes place at frequencies adjacent to frequencies at which at least a portion of downlink communications takes place over the FDD frequency band.

18. The apparatus of claim 14, wherein the first specified frequency band is a time division duplex (TDD) frequency band, and the third specified frequency band is a frequency division duplex (FDD) frequency band, and wherein the processing element is configured to further cause the first wireless communications device to perform one of:

decrease a downlink communications bandwidth in the FDD frequency band when at least a portion of downlink communications over the FDD frequency band takes place at frequencies adjacent to frequencies at which at least a portion of uplink communications takes place over the TDD frequency band; or decrease an uplink communications bandwidth in the FDD frequency band when at least a portion of uplink communications over the FDD frequency band takes place at frequencies adjacent to frequencies at which at least portions of downlink communications takes place over the TDD frequency band.

19. The apparatus of claim 14, wherein the processing element is configured to further cause the first wireless communications device to perform one of:

leave the first bandwidth unadjusted, when uplink communications over the first specified frequency band take place at frequencies adjacent to frequencies at which uplink communications takes place over the second specified frequency band; or leave the second bandwidth unadjusted, when downlink communications over the first specified frequency band take place at frequencies adjacent to frequencies at which downlink communications takes place over the second specified frequency band.

20. The apparatus of claim 14, wherein the processing element is configured to further cause the first wireless communications device to:

adjust a communications bandwidth within the first specified frequency band to be of a first size during a first portion of a specified data transmission period and to be of a second size during a second portion of the specified data transmission period, when at least a portion of communications in the first specified frequency band take place at frequencies adjacent to frequencies at which at least a portion of communications in the second specified frequency band takes place.

* * * * *